US007599529B2

(12) United States Patent
Fujii

(10) Patent No.: US 7,599,529 B2
(45) Date of Patent: Oct. 6, 2009

(54) ORGANISM CHARACTERISTIC DATA ACQUIRING APPARATUS, AUTHENTICATION APPARATUS, ORGANISM CHARACTERISTIC DATA ACQUIRING METHOD, ORGANISM CHARACTERISTIC DATA ACQUIRING PROGRAM AND COMPUTER-READABLE RECORDING MEDIUM ON WHICH THE PROGRAM IS RECORDED

(75) Inventor: Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 10/705,455

(22) Filed: Nov. 12, 2003

(65) Prior Publication Data

US 2004/0114784 A1 Jun. 17, 2004

(30) Foreign Application Priority Data

Nov. 12, 2002 (JP) ............................. 2002-327910

(51) Int. Cl.
 *G06K 9/00* (2006.01)
(52) U.S. Cl. ....................................... 382/124; 382/112
(58) Field of Classification Search ................. 382/115, 382/116, 124, 125, 168, 169, 170, 112
 See application file for complete search history.

(56) References Cited

U.S. PATENT DOCUMENTS

| 4,827,527 | A | * | 5/1989 | Morita et al. ................ 382/127 |
| 5,067,162 | A | * | 11/1991 | Driscoll et al. ............... 382/126 |
| 6,002,787 | A | * | 12/1999 | Takhar et al. ................ 382/125 |
| 6,052,474 | A | * | 4/2000 | Nakayama ................... 382/124 |
| 6,134,340 | A | * | 10/2000 | Hsu et al. .................... 382/124 |
| 6,195,447 | B1 | * | 2/2001 | Ross ........................... 382/125 |
| 6,201,886 | B1 | * | 3/2001 | Nakayama ................... 382/124 |
| 6,289,114 | B1 | * | 9/2001 | Mainguet ..................... 382/124 |
| 6,459,804 | B2 | | 10/2002 | Mainguet ..................... 382/124 |
| 2002/0003892 | A1 | | 1/2002 | Iwanaga ...................... 382/124 |
| 2002/0012455 | A1 | | 1/2002 | Benckert ..................... 382/124 |

FOREIGN PATENT DOCUMENTS

EP 1093079 4/2001

(Continued)

OTHER PUBLICATIONS

Patent Abstracts of Japan, Publication No. 08161487, Published Jun. 21, 1996 (English language).

(Continued)

*Primary Examiner*—Charles Kim
*Assistant Examiner*—Stephen R Koziol
(74) *Attorney, Agent, or Firm*—Staas & Halsey LLP

(57) ABSTRACT

The invention provides an apparatus by which organism characteristic data included in an entire image can be acquired without producing the entire image from a plurality of partial images. The apparatus detects, every time a partial image is sampled, a relative positional relationship between the partial image and a different partial image sampled already, and extracts characteristic portion data including characteristic information unique to the organism portion from the partial image. Then, the apparatus synthesizes the extracted characteristic portion data of the partial image and characteristic portion data of the different partial image based on the detected relative positional relationship of the partial image. The apparatus can be applied, for example, to an authentication apparatus which uses a sweep type fingerprint sensor.

22 Claims, 23 Drawing Sheets

FOREIGN PATENT DOCUMENTS

| | | |
|---|---|---|
| JP | 59-103178 | 6/1984 |
| JP | 61-199173 | 9/1986 |
| JP | 5-108805 | 4/1993 |
| JP | 8-161487 | 6/1996 |
| JP | HEI 10-91769 | 4/1998 |
| JP | 2001-118065 | 4/2001 |
| WO | 00/68873 | 11/2000 |
| WO | WO 01/80167 A1 | 10/2001 |
| WO | WO 02/11066 A1 | 2/2002 |

OTHER PUBLICATIONS

Japanese Patent Office Action, mailed Aug. 12, 2008 and issued in corresponding Japanese Patent Application No. 2002-327910.

* cited by examiner

FIG. 5C SWEEP IMAGE 3
FIG. 5B SWEEP IMAGE 2
FIG. 5A SWEEP IMAGE 1

FIG. 9A

| END 1 | MINUTIA b |
| END 2 | MINUTIA a |
| MINUTIA a | MINUTIA b |
| END 3 | MINUTIA a |
| END 4 | MINUTIA b |

CONNECTION DATA TABLE

FIG. 9B

| END 1 | END 5 |
| END 2 | END 6 |
| END 7 | MINUTIA c |
| END 8 | MINUTIA c |
| END 9 | END 10 |
| END 11 | MINUTIA c |
| END 3 | END 12 |
| END 4 | END 13 |

CONNECTION DATA TABLE

FIG. 9C

| END 5 | MINUTIA d |
| END 6 | MINUTIA d |
| END 7 | END 15 |
| END 8 | END 16 |
| END 9 | MINUTIA e |
| MINUTIA e | END 17 |
| END 18 | END 19 |
| MINUTIA e | END 20 |
| END 10 | END 21 |
| END 11 | END 22 |
| END 12 | MINUTIA f |
| END 13 | MINUTIA f |
| END 23 | MINUTIA f |
| END 14 | MINUTIA d |

CONNECTION DATA TABLE

FIG. 10

| | |
|---|---|
| MINUTIA b | MINUTIA d |
| MINUTIA a | MINUTIA d |
| MINUTIA a | MINUTIA b |
| MINUTIA a | MINUTIA f |
| MINUTIA b | MINUTIA f |
| MINUTIA c | END 15 |
| END 14 | MINUTIA d |
| MINUTIA c | END 16 |
| MINUTIA e | END 21 |
| MINUTIA e | END 17 |
| END 18 | END 19 |
| MINUTIA e | END 20 |
| END 23 | MINUTIA f |
| MINUTIA c | END 22 |

FIG. 11A SWEEP IMAGE 1
FIG. 11B SWEEP IMAGE 2
FIG. 11C SWEEP IMAGE 3

FIG. 15A

| MINUTIA b | RIDGE 1 |
| | RIDGE 2 |
| | RIDGE 3 |
| MINUTIA a | RIDGE 2 |
| | RIDGE 5 |
| | RIDGE 4 |

CONNECTION DATA TABLE

FIG. 15B

| MINUTIA a | RIDGE 2 |
| | RIDGE 5 |
| | RIDGE 4 |
| MINUTIA c | RIDGE 6 |
| | RIDGE 7 |
| | RIDGE 8 |

CONNECTION DATA TABLE

FIG. 15C

| MINUTIA d | RIDGE 1 |
| | RIDGE 5 |
| | RIDGE 14 |
| MINUTIA e | RIDGE 9 |
| | RIDGE 10 |
| | RIDGE 11 |
| MINUTIA f | RIDGE 3 |
| | RIDGE 4 |
| | RIDGE 13 |

CONNECTION DATA TABLE

FIG. 16

| MINUTIA b | MINUTIA d |
| --- | --- |
| | MINUTIA a |
| | MINUTIA f |
| MINUTIA a | (MINUTIA b) |
| | MINUTIA d |
| | MINUTIA f |
| MINUTIA c | RIDGE 6 |
| | RIDGE 7 |
| | RIDGE 8 |
| MINUTIA d | (MINUTIA b) |
| | (MINUTIA a) |
| | RIDGE 14 |
| MINUTIA e | RIDGE 9 |
| | RIDGE 10 |
| | RIDGE 11 |
| MINUTIA f | (MINUTIA b) |
| | (MINUTIA a) |
| | RIDGE 13 |

FIG. 19A SWEEP IMAGE 1
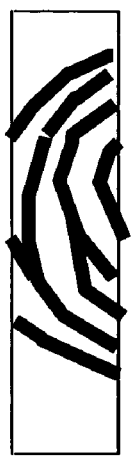
FIG. 19B SWEEP IMAGE 2
FIG. 19C SWEEP IMAGE 3

ORGANISM CHARACTERISTIC DATA ACQUIRING APPARATUS, AUTHENTICATION APPARATUS, ORGANISM CHARACTERISTIC DATA ACQUIRING METHOD, ORGANISM CHARACTERISTIC DATA ACQUIRING PROGRAM AND COMPUTER-READABLE RECORDING MEDIUM ON WHICH THE PROGRAM IS RECORDED

BACKGROUND OF THE INVENTION

1) Field of the Invention

The present invention relates to a technique for acquiring organism characteristic data from organism information such as, for example, a fingerprint, a palmar pattern, a blood vessel pattern (fundus retina vasoganglion, vein vasoganglion) and an iris muscle pattern and particularly to a technique for acquiring organism characteristic data (fingerprint data or ridge structure data including characteristic point information) necessary for personal identification and so forth from a plurality of partial images (fingerprint images) sampled successively, for example, while a finger is moved with respect to a sensor face in a sweep type fingerprint sensor.

2) Description of the Related Art

With improvement in function in recent years, small-size information apparatus such as a portable telephone set and a PDA (Personal Digital Assistant) now allow connection to a network and storage of a great amount of personal information and so forth. Therefore, a demand for improvement in the security performance in apparatus of the type just mentioned is increasing significantly.

In order to assure the security in apparatus of the type mentioned, personal identification based on a password, an ID (IDentification) card and so forth conventionally used commonly can be adopted. However, the password and the ID card have a high degree of possibility of misappropriation. Therefore, it is much demanded to achieve personal identification (identification for certifying that a user of an apparatus is the one registered in advance) having a high degree of reliability. Personal identification based on organism information (biometrics information) has a high degree of reliability. Therefore, it is considered that the personal identification just described can satisfy the demand described above. Particularly, where a fingerprint is used as the organism information, not only the reliability but also the convenience are high.

Where personal identification is performed using a fingerprint as organism information, a capacitance type fingerprint sensor or an optical type fingerprint sensor is used to sample a fingerprint (a pattern formed from ridges which may contact with a sensor face of the fingerprint sensor and groove lines which do not contact with the sensor face) as image information from a finger of an object person of the authentication. Thereafter, characteristic information (for example, position information of a branch point or an end point) is extracted from a foreground of the fingerprint image (for example, a ridge image). Then, the extracted characteristic information and registration characteristic information of the object person of the authentication registered in advance are collated with each other. Thus, decision whether or not the object person of the authentication is the original person, that is, the personal identification, is performed.

Incidentally, a general fingerprint sensor (plane type fingerprint sensor) for sampling a fingerprint image from an object person of authentication normally has a sensor face having a size greater than that of a finger. However, in recent years, in order to incorporate a fingerprint sensor into small-size information apparatus such as a portable telephone set and a PDA, such a method as described below is utilized. In particular, the sensor face is formed smaller than that of a finger and a plurality of partial images sampled through the sensor face are synthesized to obtain an image of an entire fingerprint.

As a fingerprint sensor which can deal with the situation just described, a sweep type fingerprint sensor is available. The sweep type fingerprint sensor has a rectangular sensor face (image pickup face) having a length and an area sufficiently smaller than those of a finger. It is to be noted that, relative movement of a finger with respect to a sensor face is hereafter referred to as "sweep".

Where the sweep type fingerprint sensor is used, a plurality of partial images of a fingerprint are successively sampled by the fingerprint sensor while the finger is moved with respect to the sensor face or the sensor face (fingerprint sensor) is moved with respect to the finger. Then, an entire fingerprint image (a full image) is reconstructed based on a plurality of thus sampled partial images (refer to Japanese Patent Laid-Open No. 91769/1998).

In particular, if the sweep type fingerprint sensor is used, then, for example, a great number of rectangular fingerprint partial images as shown in FIG. 24 can be picked up. Conventionally (according to a system disclosed in Japanese Patent Laid-Open No. 91769/1998), in order to perform personal identification using the fingerprint partial images, the fingerprint partial images are synthesized as shown in FIG. 25 to form a single entire fingerprint image (called full image in Japanese Patent Laid-Open No. 91769/1998). Thereafter, the personal identification is performed using a method similar to that used for fingerprint identification performed using the plane type fingerprint sensor. In particular, referring to FIG. 26, a plurality of fingerprint partial images 1 to n are connected to each other (step S1), and image processes such as a binarization process and a thinning process are performed for the reconstructed entire fingerprint image (step S2). Then, information of a characteristic point (minutia; a branch point or an end point of a ridge) is extracted and produced as organism characteristic data from the entire fingerprint image after the image process is performed (step S3), and personal identification is performed based on the extracted fingerprint data.

It is to be noted that, in FIG. 25, an arrow mark V1 indicates a vector which indicates a relative positional relationship between a first fingerprint partial image and a second fingerprint partial image. Further, another arrow mark V2 indicates a vector which indicates a relative positional relationship between the second fingerprint partial image and a third fingerprint partial image.

However, as described above, the conventional technique that a plurality of rectangular fingerprint partial images are synthesized with each other to produce a single entire fingerprint image and the image processes are performed for the entire fingerprint image and then organism characteristic data is extracted from the image for which the image processes have been performed to perform personal identification have the following two subjects (1) and (2).

(1) After a plurality of rectangular fingerprint partial images are synthesized with each other to produce an entire fingerprint image, the image processes and organism characteristic data extraction process are performed. Therefore, a memory capacity for storing at least an entire fingerprint image is required. Actually, when various processes are performed for an entire fingerprint image, the entire fingerprint image must be copied. Therefore, a memory capacity equal to two or three times the data amount of the entire fingerprint image is required.

(2) The image processes, organism characteristic data extraction process and personal identification process (collation process of fingerprint data) described above are started after sliding movement of a finger on the sweep type fingerprint sensor is completed. This is because an entire fingerprint image can be produced only after the finger is slidably moved to the last end and a plurality of rectangular fingerprint partial images which cover the entire fingerprint are acquired. Therefore, while a finger is slidably moved on the sweep type fingerprint sensor, even if a CPU is idle, the various processes described above cannot be assigned to the CPU.

SUMMARY OF THE INVENTION

It is an object of the present invention to provide a countermeasure which allows organism characteristic data included in an entire image to be acquired without producing the entire image from a plurality of partial images so that the memory capacity necessary for processing can be reduced significantly and a CPU which executes the processing can be utilized very effectively.

In order to attain the object described above, according to an aspect of the present invention, there is provided an organism characteristic data acquiring apparatus, comprising a sampling section for sampling a partial image of a portion of an organism, a detection section for detecting, every time a partial image is sampled by the sampling section, a relative positional relationship between the partial image and one of other partial images sampled already, an extraction section for extracting, every time a partial image is sampled by the sampling section, characteristic portion data including characteristic information unique to the organism portion from the partial image, and a synthesis section for synthesizing, every time a partial image is sampled by the sampling section, the characteristic portion data of the partial image extracted by the extraction section and characteristic portion data of the other partial image based on the relative positional relationship of the partial image detected by the detection section and outputting a result of the synthesis as organism characteristic data of the portion of the organism.

According to another aspect of the present invention, there is provided an organism characteristic data acquiring apparatus, comprising a sampling section for sampling a partial image of a pattern formed from a ridge on a portion of an organism, a detection section for detecting, every time a partial image is sampled by the sampling section, a relative positional relationship between the partial image and one of other partial images sampled already, an extraction section for extracting, every time a partial image is sampled by the sampling section, ridge structure data including characteristic information unique to the organism portion from the partial image, and a synthesis section for synthesizing, every time a partial image is sampled by the sampling section, the ridge structure data of the partial image extracted by the extraction section and ridge structure data of the other partial image based on the relative positional relationship of the partial image detected by the detection section and outputting a result of the synthesis as organism characteristic data of the portion of the organism.

According to a further aspect of the present invention, there is provided an authentication apparatus, comprising a sampling section for sampling a partial image of a portion of an organism of an object person of authentication, a detection section for detecting, every time a partial image is sampled by the sampling section, a relative positional relationship between the partial image and one of other partial images sampled already, an extraction section for extracting, every time a partial image is sampled by the sampling section, characteristic portion data including characteristic information unique to the organism portion from the partial image, a synthesis section for synthesizing, every time a partial image is sampled by the sampling section, the characteristic portion data of the partial image extracted by the extraction section and characteristic portion data of the other partial image based on the relative positional relationship of the partial image detected by the detection section and outputting a result of the synthesis as organism characteristic data of the portion of the organism, and a collation section for executing a collation process using the organism characteristic data from the synthesis section in order to perform personal identification of the object person of authentication.

According to a still further aspect of the present invention, there is provided an authentication apparatus, comprising a sampling section for sampling a partial image of a pattern formed from a ridge on a portion of an organism of an object person of authentication, a detection section for detecting, every time a partial image is sampled by the sampling section, a relative positional relationship between the partial image and one of other partial images sampled already, a ridge structure data extraction section for extracting, every time a partial image is sampled by the sampling section, ridge structure data including characteristic information unique to the organism portion from the partial image, a synthesis section for synthesizing, every time a partial image is sampled by the sampling section, the ridge structure data of the partial image extracted by the ridge structure data extraction section and ridge structure data of the other partial image based on the relative positional relationship of the partial image detected by the detection section and outputting a result of the synthesis, a characteristic data extraction section for extracting characteristic data unique to the organism portion from the result of the synthesis outputted from the synthesis section, and a collation section for executing a collation process using the characteristic data extracted by the characteristic data extraction section in order to perform personal identification of the object person of authentication.

According to a yet further aspect of the present invention, there is provided an organism characteristic data acquiring method, comprising a sampling step of sampling a partial image of a portion of an organism, a detection step of detecting, every time a partial image is sampled at the sampling step, a relative positional relationship between the partial image and one of other partial images sampled already, an extraction step of extracting, every time a partial image is sampled at the sampling step, characteristic portion data including characteristic information unique to the organism portion from the partial image, and a synthesis step of synthesizing, every time a partial image is sampled at the sampling step, the characteristic portion data of the partial image extracted at the extraction step and characteristic portion data of the other partial image based on the relative positional relationship of the partial image detected at the detection step and outputting a result of the synthesis as organism characteristic data of the portion of the organism.

According to an additional aspect of the present invention, there is provided an organism characteristic data acquiring method, comprising a sampling step of sampling a partial image of a pattern formed from a ridge on a portion of an organism, a detection step of detecting, every time a partial image is sampled at the sampling step, a relative positional relationship between the partial image and one of other partial images sampled already, an extraction step of extracting, every time a partial image is sampled at the sampling step, ridge structure data including characteristic information unique to the organism portion from the partial image, and a synthesis step of synthesizing, every time a partial image is sampled at the sampling step, the ridge structure data of the partial image extracted at the extraction step and ridge structure data of the other partial image based on the relative positional relationship of the partial image detected at the detection step and outputting a result of the synthesis as organism characteristic data of the portion of the organism.

According to another additional aspect of the present invention, there is provided an organism characteristic data acquiring program which causes a computer to function as a detection section for detecting, every time a partial image is sampled by a sampling section for sampling a partial image of a portion of an organism, a relative positional relationship between the partial image and one of other partial images sampled already, an extraction section for extracting, every time a partial image is sampled by the sampling section, characteristic portion data including characteristic information unique to the organism portion from the partial image, and a synthesis section for synthesizing, every time a partial image is sampled by the sampling section, the characteristic portion data of the partial image extracted by the extraction section and characteristic portion data of the other partial image based on the relative positional relationship of the partial image detected by the detection section and outputting a result of the synthesis as organism characteristic data of the portion of the organism.

According to a further additional aspect of the present invention, there is provided an organism characteristic data acquiring program which causes a computer to function as a detection section for detecting, every time a partial image is sampled by a sampling section for sampling a partial image of a pattern formed from a ridge on a portion of an organism, a relative positional relationship between the partial image and one of other partial images sampled already, an extraction section for extracting, every time a partial image is sampled by the sampling section, ridge structure data including characteristic information unique to the organism portion from the partial image, and a synthesis section for synthesizing, every time a partial image is sampled by the sampling section, the ridge structure data of the partial image extracted by the extraction section and ridge structure data of the other partial image based on the relative positional relationship of the partial image detected by the detection section and outputting a result of the synthesis as organism characteristic data of the portion of the organism.

According to a still further additional aspect of the present invention, there is provided a computer-readable recording medium on which any of the organism characteristic data acquiring programs described above is recorded.

According to the present invention, the following advantages can be achieved.

(1) Every time a partial image is sampled from an organism portion, a process for detecting a relative positional relationship of the partial image, a process for extracting characteristic portion data from the partial image and a process for synthesizing the extracted characteristic portion data are performed. Therefore, every time a partial image is sampled, organism characteristic data (characteristic portion data) in the partial image can be obtained without producing an entire image (for example, an entire fingerprint image/full or complete image) composed of a plurality of partial images. In particular, not organism characteristic data (fingerprint data including characteristic point information) necessary for personal identification and so forth is extracted by producing an entire image and thereafter performing image processes for it but each of partial images is determined as an object of the image processes and characteristic portion data is acquired at any time from each partial image. Therefore, the memory capacity necessary for image processes can be drastically reduced. Further, since a characteristic extraction process is started without producing an entire image, the characteristic extraction process can be allocated to a CPU in parallel to an I/O process of a sampling section such as a fingerprint sensor to cause the CPU to perform them. Therefore, the CPU can be utilized very effectively.

(2) Where partial images of patterns each including ridges at an organism portion are sampled and connectional relationship information between characteristic points of ridges and ridges (ridge ends) at an end of each of the partial images is extracted as characteristic portion data, when the characteristic portion data are to be synthesized, only if the connectional relationship information in the fingerprint partial images is followed, then connectional relationships of the characteristic points included in the plurality of fingerprint partial images can be obtained as organism characteristic data. At this time, where an identifier is applied to minutiae same as each other or ridge ends same as each other which commonly exist in different fingerprint partial images, connectional relationship information in the fingerprint partial images can be easily followed, and a connectional relationship between characteristic points included in a plurality of fingerprint partial images can be obtained very easily.

(3) Similarly, where partial images of patterns each including ridges at an organism portion are sampled and connectional relationship information between characteristic points of ridges and ridges connecting to the characteristic points is extracted as characteristic portion data, when the characteristic portion data are to be synthesized, only if the connectional relationship information in the fingerprint partial images is followed, then connectional relationships of the characteristic points included in the plurality of fingerprint partial images can be obtained as organism characteristic data. At this time, where an identifier is applied to minutiae same as each other or ridge ends same as each other which commonly exist in different fingerprint partial images, connectional relationship information in the fingerprint partial images can be easily followed, and a connectional relationship between characteristic points included in a plurality of fingerprint partial images can be obtained very easily.

(4) Ridge structure data (for example, a skeleton line image obtained by thinning a ridge image or a binarized image obtained by binarizing a ridge image) maybe extracted as the characteristic portion data. Conventionally, various image processes (a binarization process, a thinning process and so forth) for removing cracks, adhesions, noise and so forth appearing on ridges are performed for an entire image in order to correctly extract a skeleton line image. However, where such ridge structure data as described above are extracted as the characteristic portion data, every time a partial image is sampled, the image processes are performed for the partial image. Consequently, the memory capacity necessary for the image processes can be reduced significantly. Further, since the image processes are started without producing an entire image, the image processes can be assigned to the CPU in parallel to an I/O process of a sampling section such as a fingerprint sensor so that the CPU may perform the processes. Consequently, the CPU can be utilized very effectively.

(5) Where, as a relative positional relationship between a partial image of an object of processing and a different partial image processed already, such a superposition positional relationship that ridges same as each other in the two partial images connect smoothly to each other or a corresponding relationship between such same ridges in the partial images is detected, a relative positional relationship of a plurality of partial images can be grasped readily. Thus, characteristic portion data can be synthesized readily using the relative positional relationship.

(6) Where an organism portion is re-placed by a plural number of times on a sampling face for sampling a partial image to successively sample a partial image of the organism portion or where an organism portion is moved relative to a sampling face for sampling a partial image to successively sample a partial image (for example, where a sweep type fingerprint sensor is used), characteristic portion data of a partial image which has a side commonly shared by, or has a region overlapping with, at least one of a plurality of fingerprint partial images is determined as an object of a synthesis process. In other words, since a partial image which does not have a common portion to any other partial image does not allow it to obtain a relative positional relationship with any other partial image and characteristic portion data of the partial image cannot be synthesized with characteristic portion data of any other partial image, the characteristic portion data regarding the partial image is excepted from an object of a synthesis process. Consequently, it can be prevented to perform a wasteful synthesis process, and the processing efficiency can be improved.

(7) Where personal identification of an object person of identification is performed based on organism characteristic data acquired by the organism characteristic data acquiring apparatus of the present invention, personal identification having high reliability can be performed at a high speed, for example, using a sweep type fingerprint sensor or the like.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 5A to 5C, 6A to 6C, 7A to 7C, 8A to 8C, 9A to 9C and 10 are schematic views illustrating a first example of an organism characteristic data acquiring process in the first embodiment;

FIGS. 11A to 11C, 12A to 12C, 13A to 13C, 14A to 14C, 15A to 15C and 16 are schematic views illustrating a second example of the organism characteristic data acquiring process in the first embodiment;

FIGS. 19A to 19C, 20A to 20C and 21 are schematic views illustrating an organism characteristic data acquiring process in the second embodiment;

DESCRIPTION OF THE PREFERRED EMBODIMENT

[1] First Embodiment

Figure 1:
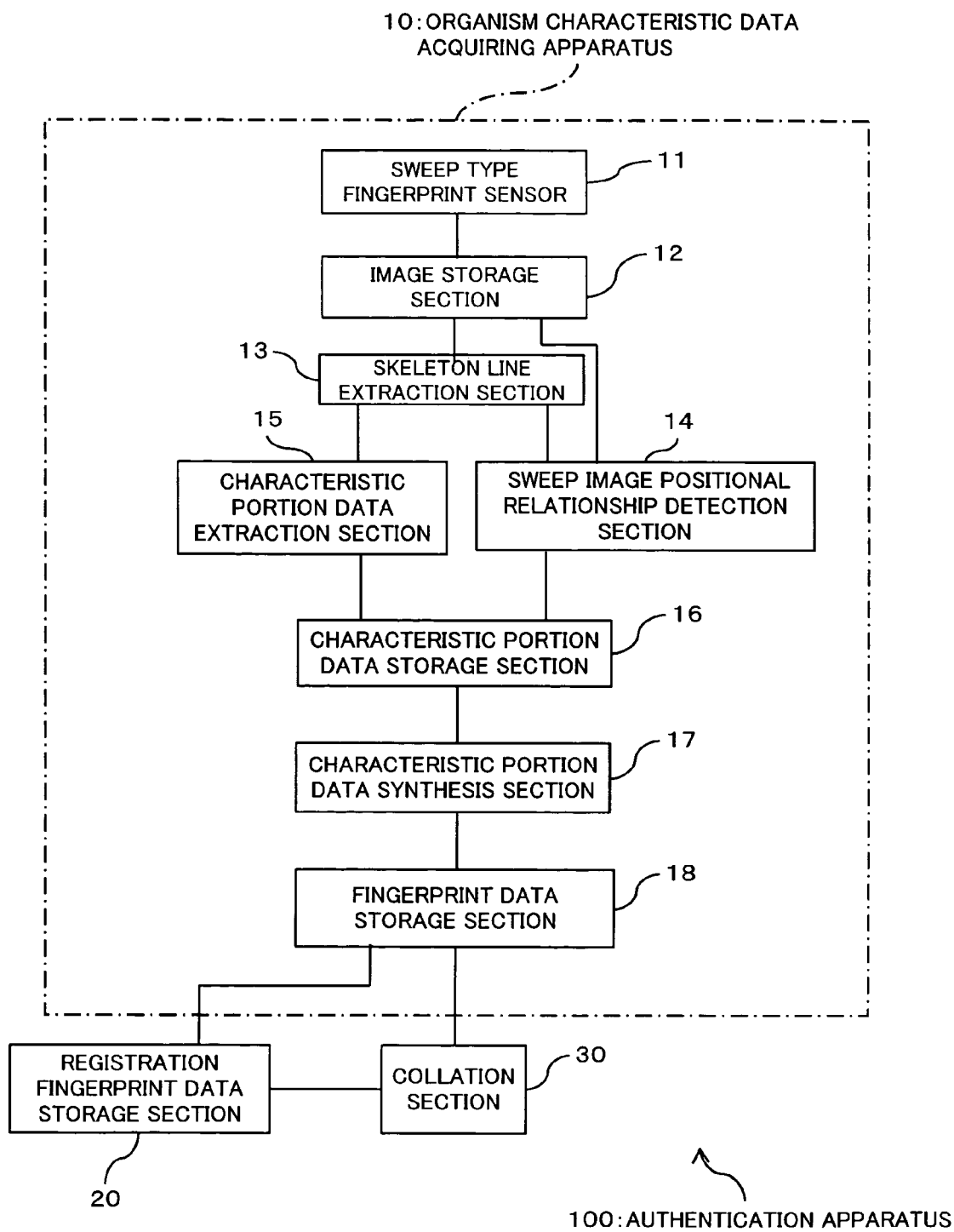
FIG. 1 is a block diagram showing a configuration of an organism characteristic data acquiring apparatus and an authentication apparatus according to a first embodiment of the present invention.

[1-1] Configuration of the Organism Characteristic Data Acquiring Apparatus and Authentication Apparatus of the First Embodiment FIG. 1 is a block diagram showing a configuration of an organism characteristic data acquiring apparatus and an authentication apparatus according to a first embodiment of the present invention. The authentication apparatus 100 of the first embodiment shown in FIG. 1 performs personal identification using a fingerprint as organism information and includes an organism characteristic data acquiring apparatus 10, a registration fingerprint data storage section 20 and a collation section 30.

The organism characteristic data acquiring apparatus 10 of the first embodiment is provided for acquiring fingerprint data as organism characteristic data necessary for personal identification from an object person of identification. The organism characteristic data acquiring apparatus 10 includes a sweep type fingerprint sensor 11, an image storage section 12, a skeleton line extraction section 13, a sweep image positional relationship detection section 14, a characteristic portion data extraction section 15, a characteristic portion data storage section 16, a characteristic portion data synthesis section 17 and a fingerprint data storage section 18.

Actually, the organism characteristic data acquiring apparatus 10 and the authentication apparatus 100 of the first embodiment are implemented by combining the sweep type fingerprint sensor 11 with a general personal computer having a CPU (Central Processing Unit), a ROM (Read Only Memory), a RAM (Random Access Memory) and other necessary apparatus. At this time, functions as the skeleton line extraction section 13, sweep image positional relationship detection section 14, characteristic portion data extraction section 15 and characteristic portion data synthesis section 17 are implemented by executing a predetermined program (organism characteristic data acquiring program) by means of a CPU (computer). Further, also a function as the collation section 30 is implemented by executing a predetermined program (collation program) by means of the CPU. On the other hand, functions as the image storage section 12, characteristic portion data storage section 16 and fingerprint data storage section 18 are implemented by the RAM. Further, a function as the registration fingerprint data storage section 30 is implemented by the RAM or ROM. It is to be noted that functions as the storage sections 12, 16, 18 and 30 may be implemented by a storage apparatus such as a hard disk incorporated in a personal computer or an external storage apparatus.

The organism characteristic data acquiring program and the collation program described above are recorded on a computer-readable recording medium such as, for example, a flexible disk and a CD-ROM and are provided as such. In the present embodiment, the organism characteristic data acquiring program and the collation program are stored in advance in the ROM, and the programs are read out from the ROM into and executed by the CPU. It is to be noted that the programs may be handled such that they are stored in advance in a storage apparatus (recording medium) such as, for example, a magnetic disk, an optical disk or a magneto-optical disk and are provided to a computer (CPU) from the storage apparatus through a communication path.

The sweep type fingerprint sensor (sampling section) 11 successively samples partial images (which may be hereinafter referred to as sweep images) of an organism portion (in the present embodiment, a fingerprint) of an object person of identification and has a sensor face (not shown) having a transverse width approximately equal to a finger width and a longitudinal dimension of approximately several mm. The fingerprint sensor 11 is used such that a finger of an object person of identification is moved in contact relatively with respect to the sensor face to successively sample partial images of a fingerprint of the finger.

A fingerprint is formed on a skin (finger; organism portion) of an object person of identification and is formed from ridge lines (contacting portions) which may contact with the sensor face and groove lines (non-contacting portions/void portions) which do not contact with the sensor face. The fingerprint sensor 11 utilizes the fact that the detection sensitivity is different between the ridge portions which contact with the sensor face and groove lines which do not contact with the sensor face to sample partial images of a fingerprint as a monochrome multilevel image. In the monochrome multilevel image, the ridge portions and the groove line portions are picked up as a black image and a white image, respectively.

Upon authentication using a fingerprint, an object person of identification moves, while touching with the sensor face of the fingerprint sensor 11 with a finger thereof, the finger in an optional direction from the root side of the finger (first joint side) to the fingertip side, from the fingertip side to the root side of the finger, or from the right side to the left side of the finger.

It is to be noted, however, where a mechanism for moving the fingerprint sensor 11 with respect to a finger is provided, the object person of identification need not move a finger thereof.

In the present embodiment, a case wherein the object person of identification slidably moves a finger thereof on the sensor face from the fingertip side to the root side (first joint side) to successively sample rectangular fingerprint sweep images (fingerprint partial images) as shown in FIGS. 5A to 5C, 11A to 11C and 19A to 19C is described below. In FIGS. 5A to 5C, 11A to 11C and 19A to 19C, the fingerprint partial images are fetched in order of A, B, C by the fingerprint sensor 11. Further, it is assumed that each of fingerprint partial images sampled by the fingerprint sensor 11 in the present embodiment basically has an area (common area) which has a side shared by or overlapping with another fingerprint partial image (which has been sampled prior in time).

The image storage section 12 temporarily stores the fingerprint partial images obtained by the fingerprint sensor 11.

The skeleton line extraction section 13 performs, every time a single fingerprint partial image (a single rectangular sweep image) is sampled by the fingerprint sensor 11 and stored into the image storage section 12, image processes (in particular, a binarization process and a thinning process) for the fingerprint partial image to extract skeleton lines of fingerprint ridges (a skeleton line image as ridge structure data). It is to be noted that, in the present embodiment, as a preprocess for extracting characteristic portion data by the characteristic portion data extraction section 15, the process for extracting skeleton lines of fingerprint ridges is performed by the skeleton line extraction section 13. However, also an alternative method wherein a minutia is directly extracted from a fingerprint partial image without extracting skeleton lines can be used.

The sweep image positional relationship detection section (detection section) 14 detects, every time a single fingerprint partial image (a single rectangular sweep image) is sampled by the fingerprint sensor 11, a relative positional relationship between the fingerprint partial image and a suitable one of the other fingerprint partial images sampled already. In particular, the detection section 14 detects a relative positional relationship between a fingerprint partial image sampled in the present cycle and a suitable one of the other fingerprint partial images sampled prior.

At this time, the detection section 14 detects as a relative positional relationship such an overlapping positional relationship between the fingerprint partial image sampled in the present cycle and one of the other fingerprint partial images sampled prior that ridges same as each other in the fingerprint partial image sampled in the present cycle and the fingerprint partial image sampled prior may be smoothly connected to each other. More particularly, as described below with reference to FIGS. 3A to 3C and 4A to 4C, an overlapping positional relationship is detected as such a relative positional relationship that the positions of connection points of the ridges in two fingerprint partial images including the fingerprint partial image sampled in the present cycle and the fingerprint partial image sampled prior are coincident with each other and the variations between tangential directions of the ridges at the connection points are smooth. At this time, the overlapping positional relationship is obtained, for example, as vector data ($\Delta x$, $\Delta y$) and is stored into the characteristic portion data storage section 16 together with the characteristic portion data extracted by the characteristic portion data extraction section 15. Here, it is defined that "that the variations between tangential directions of ridges are smooth" is a state wherein, when the two fingerprint partial images are overlapped with each other, the variation amount between directions of two tangential lines (gradients) at each of the connection points of the ridges has a predetermined value or less, or the variation amount is substantially equal to that between directions of the tangential lines around each of the connection points.

As the method for detecting a relative positional relationship by means of the detection section 14, not only the method described above but also a method wherein a correlation of ridges same as each other in a fingerprint partial image sampled in the present cycle and one of the fingerprint partial images sampled prior is detected as a relative positional relationship may be used. In this case, similarly as in the method described above, two fingerprint partial images are overlapped with each other to search for a positional relationship wherein ridges and characteristic portions overlap with each other while satisfying a predetermined condition, and it is detected which ridges are same as each other in the two fingerprint partial images. Then, as described below with reference to FIGS. 13A to 13C, identifiers same as each other are applied to the ridges same as each other and a correlation between the ridges is acquired, and the correlation is used as a relative positional relationship.

It is to be noted that, as described below with reference to FIGS. 3A to 3C, the detection section 14 may detect a relative positional relationship using fingerprint partial images themselves (raw images) obtained by the fingerprint sensor 11. Or, as described below with reference to FIGS. 4A to 4C, the detection section 14 may detect a relative positional relationship using skeleton line images extracted from fingerprint partial images by the skeleton line extraction section 13.

The characteristic portion data extraction section (extraction section) 15 extracts, every time a single fingerprint partial image (a single rectangular sweep image) is sampled by the fingerprint sensor 11, characteristic portion data including characteristic information unique to an organism portion (here, a fingerprint) from the fingerprint partial image. More particularly, as described below with reference to FIGS. 6A to 8C and 12A to 14C, the characteristic portion data extraction section 15 extracts and produces characteristic portion data for producing fingerprint data from skeleton line images extracted from fingerprint partial images.

Figure 6A:
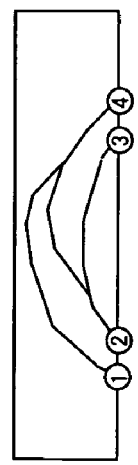
Figure 6B:
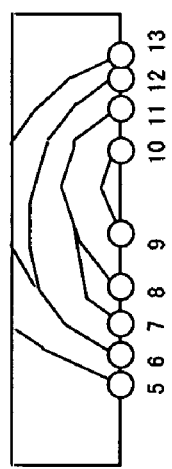
Figure 6C:
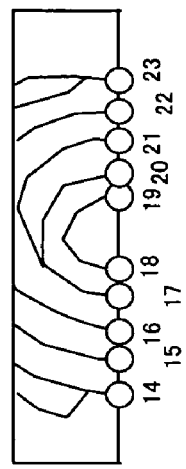
Figure 7C:
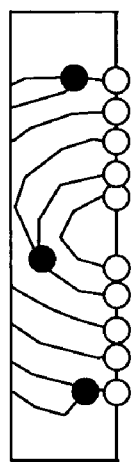
Figure 7B:
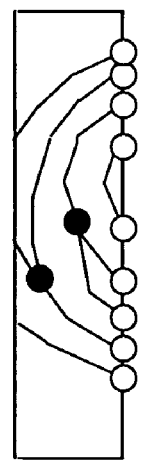
Figure 7A:
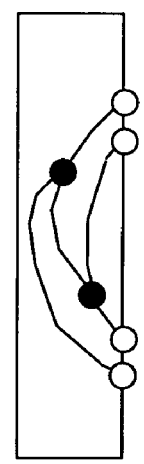

Here, the characteristic portion data extracted by the characteristic portion data extraction section 15 may be, for example, such as follows:

① information regarding a minutia (fingerprint characteristic point) of a ridge [in particular, at least one of a position, a type (end point, branch point) and a direction of a minutia];

② position of a projection minutia obtained by projecting a minutia on a ridge;

③ position of a sweat gland which exists on a ridge (an aperture point of a sweat gland is handled similarly to a minutia);

④ number of sweat glands which exist between minutiae on a ridge;

⑤ position of a ridge at an end (edge) of a fingerprint partial image (such a ridge is hereinafter referred to as ridge end)(refer to FIGS. 6A to 6C);

⑥ connectional relationship information between a minutia and a ridge end (refer to FIGS. 9A to 9C); and ⑦ connectional relationship information between a minutia and a ridge to be connected to the minutia (refer to FIGS. 15A to 15C).

In a first example of organism characteristic data acquiring operation by the first embodiment described below with reference to FIGS. 5A to 10, the characteristic portion data extraction section 15 extracts, as characteristic portion data, the position of a minutia (an endpoint, a branch point) of the article ①, the position of a ridge end of the article ⑤ and the connectional relationship information of the article ⑥. At this time, the characteristic portion data extraction section 15 assigns identifiers same as each other to a minutia or a ridge end which commonly exists on fingerprint partial images and extracts connectional relationship information using the identifier.

On the other hand, in a second example of organism characteristic data acquiring operation by the first embodiment described below with reference to FIGS. 11A to 16, a relative positional relationship between two fingerprint partial images is detected as a correlation of a ridge by the detection section 14, and the characteristic portion data extraction section 15 extracts the position of a minutia (an end point, a branch point) of the article ① and further extracts the connectional relationship information of the article ⑦ based on the ridge correlation detected by detection section 14. At this time, the characteristic portion data extraction section 15 assigns identifiers same as each other to a minutia or a ridge which commonly exists on the partial images and extracts the connectional relationship information using the identifier. It is to be noted, however, an identifier used when the detection section 14 detects a ridge correlation is assigned to the ridge.

The characteristic portion data storage section 16 stores and preserves characteristic portion data obtained from fingerprint partial images by the characteristic portion data extraction section 15 and a relative positional relationship (detected by the detection section 14) between each of the fingerprint partial images and a fingerprint partial image sampled at a directly previous timing.

The characteristic portion data synthesis section (synthesis section) 17 synthesizes, every time a single fingerprint partial image (a single rectangular sweep image) is sampled by the fingerprint sensor 11, characteristic portion data of a fingerprint partial image sampled in the present cycle and characteristic portion data regarding another fingerprint partial image extracted prior based on a relative positional relationship between the fingerprint partial image sampled in the present cycle and the fingerprint partial image sampled in the preceding cycle. Then, the characteristic portion data synthesis section 17 outputs a result of the synthesis as fingerprint data (organism characteristic data of the organism portion). In particular, the characteristic portion data synthesis section 17 synthesizes a great number of obtained fingerprint characteristic portion data to produce a single set of fingerprint data. Here, as described above, the relative positional relationship is detected by the detection section 14 and is stored in the characteristic portion data storage section 16. Further, as described above, the characteristic portion data are extracted by the characteristic portion data extraction section 15 and are stored in the characteristic portion data storage section 16.

At this time, in the first example of the organism characteristic data acquiring operation by the first embodiment described below with reference to FIGS. 5A to 10, the characteristic portion data synthesis section 17 follows or traces such connectional relationship information, for example, as illustrated in FIGS. 9A to 9C obtained by the characteristic portion data extraction section 15 to finally calculate, as fingerprint data, a connectional relationship (refer to FIG. 10) wherein characteristic points included in a plurality of fingerprint partial images are connected with each other through ridges.

On the other hand, in the second example of the organism characteristic data acquiring operation by the first embodiment described below with reference to FIGS. 11A to 16, the characteristic portion data synthesis section 17 follows or traces such connectional relationship information, for example, as illustrated in FIGS. 15A to 15C obtained by the characteristic portion data extraction section 15 to finally calculate, as fingerprint data, a connectional relationship (refer to FIG. 16) wherein minutiae included in a plurality of fingerprint partial images are connected to each other through ridges.

The fingerprint data storage section 18 stores and preserves fingerprint data obtained by the characteristic portion data synthesis section 17.

The registration fingerprint data storage section 20 retains fingerprint data registered in advance regarding an object person of identification. The fingerprint data retained by the registration fingerprint data storage section 20 may be data acquired by the organism characteristic data acquiring apparatus 10 described above or may be data acquired using another fingerprint sensor.

The collation section 30 compares fingerprint data (which is stored in the fingerprint data storage section 18) acquired by the organism characteristic data acquiring apparatus 10 and fingerprint data registered in advance in the registration fingerprint data storage section 20 regarding an object person of identification with each other to perform a collation process thereby to perform personal authentication of the object person of the identification.

[1-2] Operation of the First Embodiment

Operation of the organism characteristic data acquiring apparatus 10 and authentication apparatus 100 of the first embodiment configured as described above is described below with reference to FIGS. 2 to 16.

[1-2-1] Basic Operation

Figure 2:
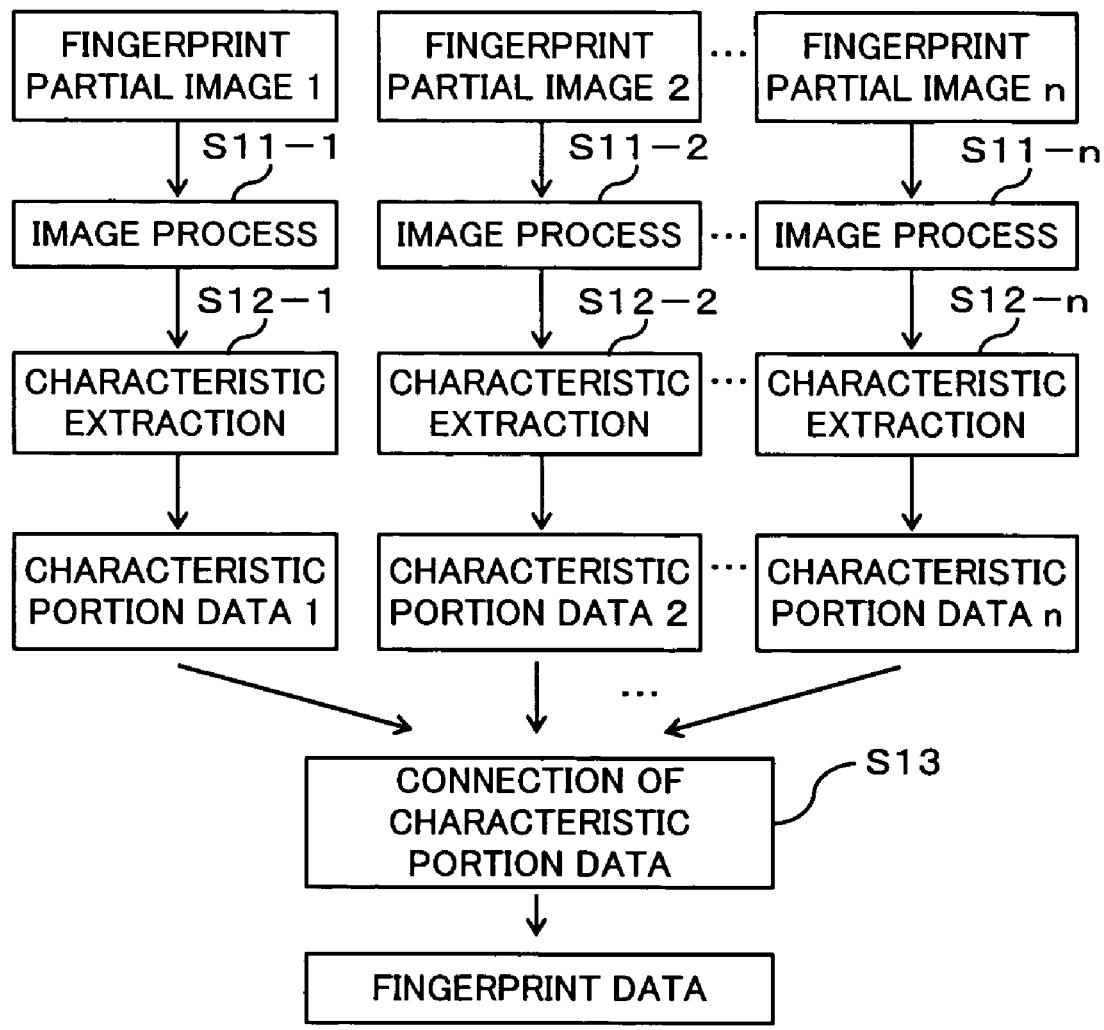
FIG. 2 is a flow chart illustrating an organism characteristic data acquiring procedure according to the first embodiment.

First, an organism characteristic data acquiring procedure in the first embodiment is described in accordance with a flow chart shown in FIG. 2.

If an object person of identification slidably moves a finger thereof from the fingertip side to the finger root side (first joint side) on the sensor face of the sweep type fingerprint sensor 11, then a plurality of rectangular fingerprint partial images 1, 2, . . . , n are successively sampled (sampling step).

Then, in the first embodiment, every time a single rectangular fingerprint partial image is sampled, an image process is immediately performed for the fingerprint partial image i (i=1, 2, . . . , n) by the skeleton line extraction section 13 to extract a skeleton line image i (step S11-*i*) Thereafter, characteristic portion data i is extracted from the skeleton line image i by the characteristic portion data extraction section 15 (extraction step S12-*i*). At this time, though not shown in FIG. 2, a relative positional relationship between the fingerprint partial image i and a fingerprint partial image i-1 sampled in the preceding cycle is detected based on the fingerprint partial images i and i-1 or the skeleton line images i and i-1 by the sweep image positional relationship detection section 14 (detection step).

The characteristic portion data i extracted by the characteristic portion data extraction section 15 is synthesized and connected to characteristic portion data i to i-1 extracted prior from the fingerprint partial images i to i-1 based on the relative positional relationship between the fingerprint partial image i and the fingerprint partial image i-1 by the characteristic portion data synthesis section 17. If characteristic portion data n extracted from the last fingerprint partial image n is synthesized and connected, then the synthesis/connection process is completed, and a result of the synthesis is outputted as fingerprint data (synthesis step S13).

Then, the fingerprint data acquired by the organism characteristic data acquiring apparatus 10 as described above (fingerprint data stored in the fingerprint data storage section 18) and the fingerprint data registered in advance in the registration fingerprint data storage section 20 regarding an object person of identification are compared and collated with each other by the collation section 30 to perform personal authentication of the object person of identification.

A first example of the relative positional relationship detection process of partial images at the detection step is described below with reference to FIGS. 3A to 3C, and a second example of the relative positional relationship detection process of partial images at the detection step is described below with reference to FIGS. 4A to 4C. Further, a first example of the organism characteristic data acquiring process at the steps S11-*i*, S12-*i*, and S13 is described below with reference to FIGS. 5A to 10, and a second example of the organism characteristic data acquiring process at the steps S11-*i*, S12-*i*, and S13 is described below with reference to FIGS. 11A to 16.

[1-2-2] First Example of the Relative Positional Relationship Detection Section of Partial Images The sweep image positional relationship detection section 14 calculates a relative positional relationship between fingerprint sweep images (first example) or skeleton line images (second example) different in time from each other.

Figure 25:
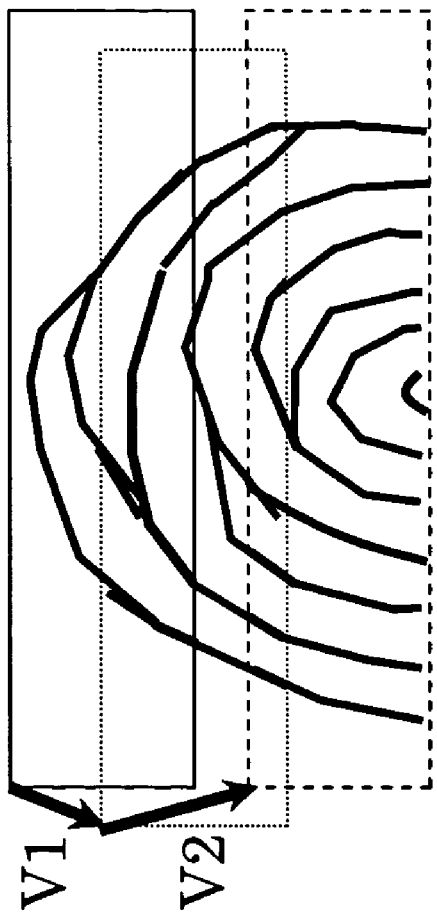
FIGS. 24 and 25 are schematic views illustrating a conventional technique wherein organism characteristic data is extracted from a plurality of partial images sampled using a sweep type fingerprint sensor.
Figure 24:
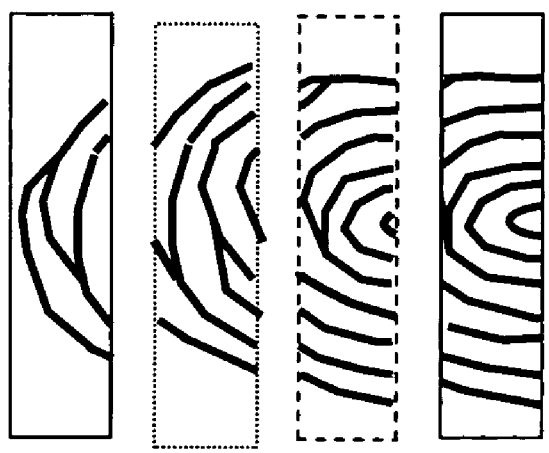
Figure 26:
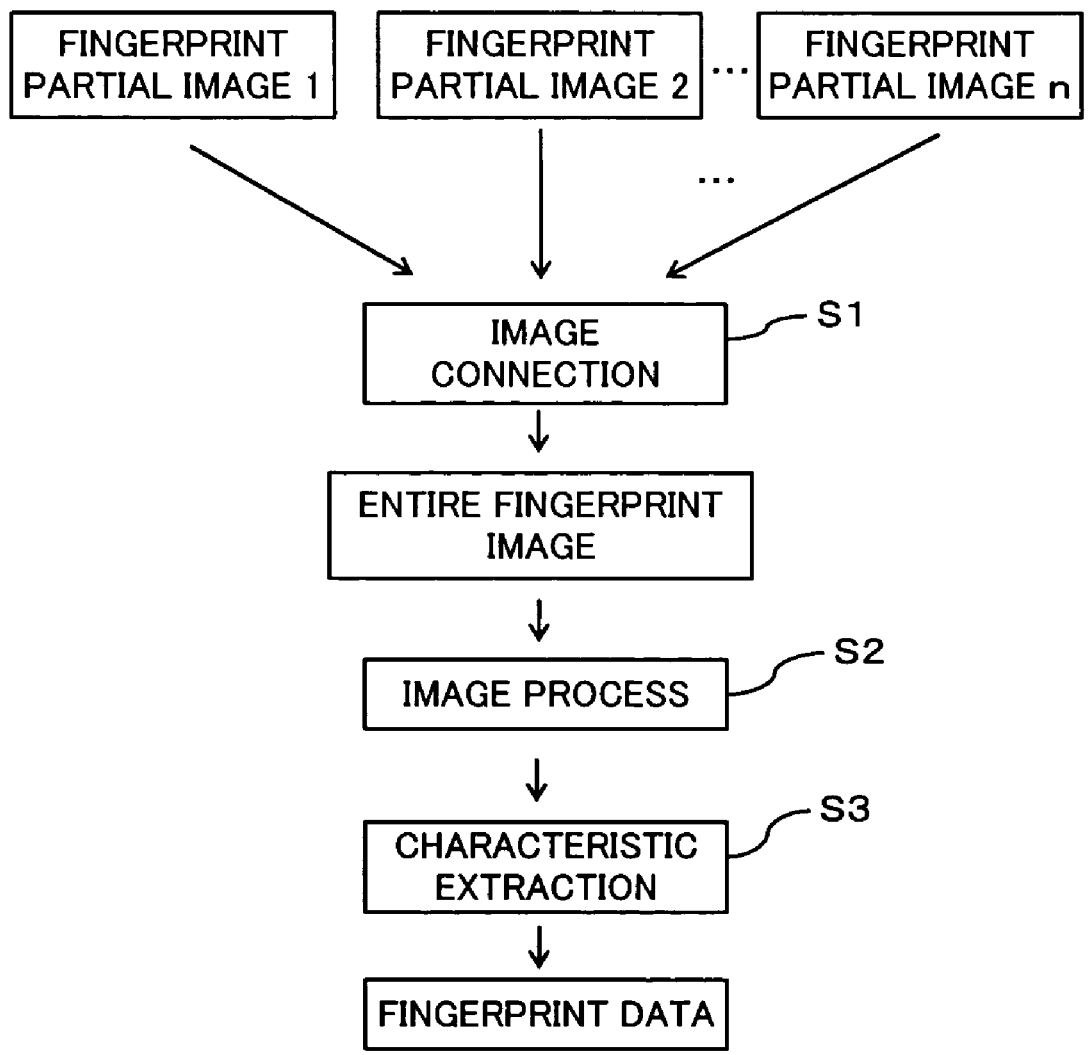
FIG. 26 is a flow chart illustrating a conventional organism characteristic data acquiring procedure.

The fingerprint sweep images are obtained by successively fetching fingerprint images while a finger is slidably moved on the sensor face of the fingerprint sensor 11. Therefore, if superposition of the obtained fingerprint sweep images is performed neatly, a fingerprint image wherein images of fingerprint ridges smoothly connect to each other can be obtained (refer to FIGS. 3C, 4C and 25).

The sweep image positional relationship detection section 14 detects a relative positional relationship (vectors V1, V2 in FIG. 25) for neatly superposing sweep images as described above in the following manner.

Figure 3A:
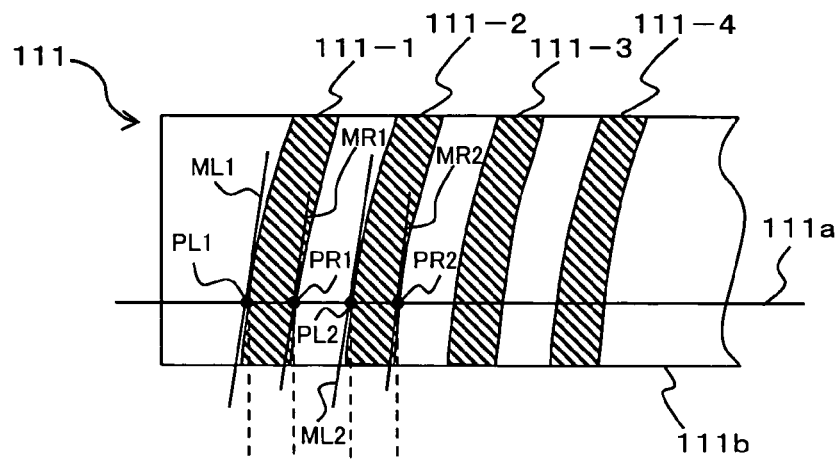
FIGS. 3A to 3C are schematic diagrammatic views illustrating a first example of a relative positional relationship detection process of partial images in the first embodiment.
Figure 3B:
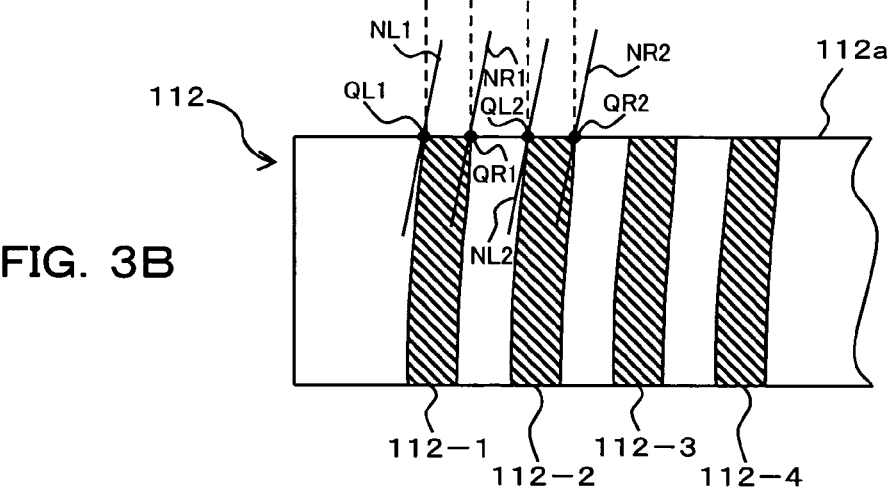
Figure 3C:
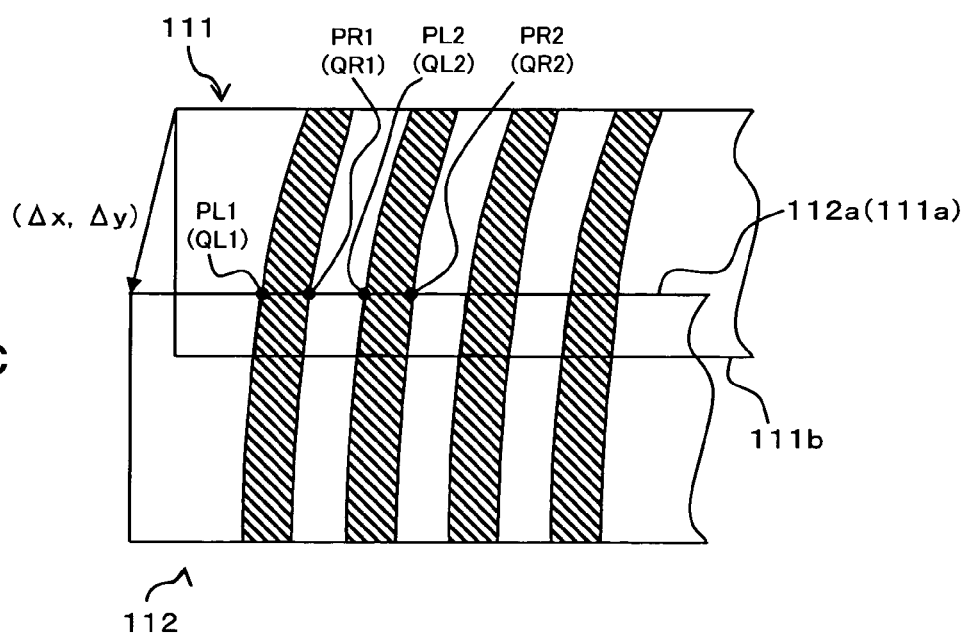

FIGS. 3A to 3C are diagrammatic view illustrating the first example of the relative positional relationship detection process of partial images in the first embodiment. In the first example, the sweep image positional relationship detection section 14 performs relative position detection using fingerprint partial images themselves (raw images) obtained by the fingerprint sensor 11.

Where a fingerprint partial image 111 shown in FIG. 3A is sampled by the fingerprint sensor 11 and then another fingerprint partial image 112 shown in FIG. 3B is sampled, a relative positional relationship between the fingerprint partial images 111 and 112 is detected by the detection section 14 in the following manner. Here, at least four ridge images 111-1 to 111-4 are included in the fingerprint partial image 111 as shown in FIG. 3A. Further, four ridge images 112-1 to 112-4 which are estimated that they continue from the ridge images 111-1 to 111-4, respectively, are included in the fingerprint partial image 112 shown in FIG. 3B.

The detection section 14 detects left and right positions of ridge images at an upper side image end 112*a* of the fingerprint partial image 112 sampled in the present cycle and detects tangential lines to the ridge images at the left and right positions. In FIG. 3B, reference characters QL1 and QR1 denote left and right positions of the ridge image 112-1 at the upper side image end 112*a*, respectively, and reference characters QL2 and QR2 denote left and right positions of the ridge image 112-2 at the upper side image end 112*a*, respectively. Further, reference characters NL1 and NR1 denote tangential lines along left and right edges of the ridge image 112-1 at the left and right positions QL1 and QR1, respectively, and reference characters NL2 and NR2 denote tangential lines along left and right edges of the ridge image 112-2 in the left and right positions QL2 and QR2, respectively. It is to be noted that, here, in order to simplify description, description of left and right positions and tangential lines of the ridge images 112-3 and 112-4 is omitted.

On the other hand, as shown in FIG. 3A, the detection section 14 scans the fingerprint partial image 111 in upward and downward directions with a searching line (connection line) 111*a* to detect left and right positions of the ridge images on the searching line 111*a* and detects tangential lines to each ridge image at the left and right positions. In FIG. 3A, reference characters PL1 and PR1 denote left and right positions of the ridge image 111-1 on the searching line 111*a*, respectively. Further, reference characters ML1 and MR1 denote tangential lines along left and right edges of the ridge image 111-1 at the left and right positions PL1 and PR1, respectively, and reference characters ML2 and MR2 denote tangential lines along left and right edges of the ridge image 111-2 at the left and right positions PL2 and PR2, respectively. It is to be noted that, here, in order to simplify description, description of left and right positions and tangential lines of the ridge images 111-3 and 111-4 is omitted.

Thus, the detection section 14 compares the positions QL1, QR1, QL2 and QR2 and the tangential lines NL1, NR1, NL2 and NR2 at the upper side image end 112a of the fingerprint partial image 112 and the positions PL1, PR1, PL2 and PR2 and the connection lines ML1, MR1, ML2 and MR2 on the searching line 111a with each other, respectively. As a result of the comparison, where the distances between the positions PL1, PR1, PL2 and PR2 on the searching line 111a are coincident with those of the positions QL1, QR1, QL2 and QR2 on the upper side image end 112a and the variations from directions of the connection lines ML1, MR1, ML2 and MR2 on the searching line 111a to directions of the tangential lines NL1, NR1, NL2 and NR2 on the upper side image end 112a are smooth, the searching line 11a is adopted as a connectional position.

Here, it is defined that, for example, "that the variation from a direction of the tangential line ML1 on the searching line 111a to a direction of the tangential line NL1 at the upper side image end 112a is smooth" is a state wherein the variation amount from the direction of the tangential line ML1 to the direction of the tangential line NL1 has a predetermined value or less, or the variation amount is substantially equal to that between directions of the tangential lines around the connection points (positions PL1, QL1).

The detection section 14 scans the fingerprint partial image 111 in the upward and downward directions with the searching line 111a to search a position of the connection line 111a which satisfies such a condition as described above.

A positional relationship of superposition (a relative positional relationship) between the fingerprint partial images 111 and 112 is detected as vector data (Δx, Δy) as shown in FIG. 3C based on the position of the combination line 111a searched out as just described and the positions PL1, PR1, PL2 and PR2 (QL1, QR1, QL2 and QR2) on the connection line 111a.

It is to be noted that, in the first example, searching for a connectional position in the fingerprint partial image 111 is performed after the positions QL1, QR1, QL2 and QR2 and the tangential lines NL1, NR1, NL2 and NR2 at the upper side image end 112a of the fingerprint partial image 112 are detected. Alternatively, however, the left and right positions of the ridge images and the tangential lines at the positions at a lower side image end 111b of the fingerprint partial image 111 may be detected, and thereafter, searching for a connectional position in the fingerprint partial image 112 may be performed similarly as in the example described above with a result of the detection. Further, a relative positional relationship detection method of partial images is disclosed in detail in a patent application by the inventor of the invention of the present application (Japanese Patent Application No. 2002-47492; filed on Feb. 25, 2002).

Figure 4A:
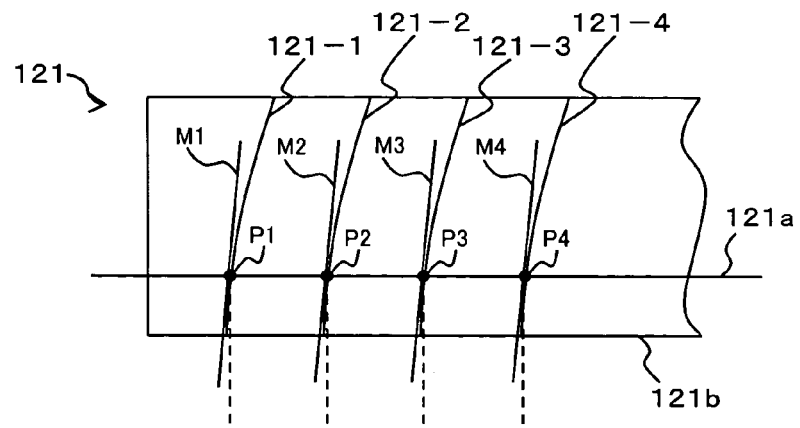
FIGS. 4A to 4C are schematic diagrammatic views illustrating a second example of the relative positional relationship detection process of partial images in the first embodiment.
Figure 4B:
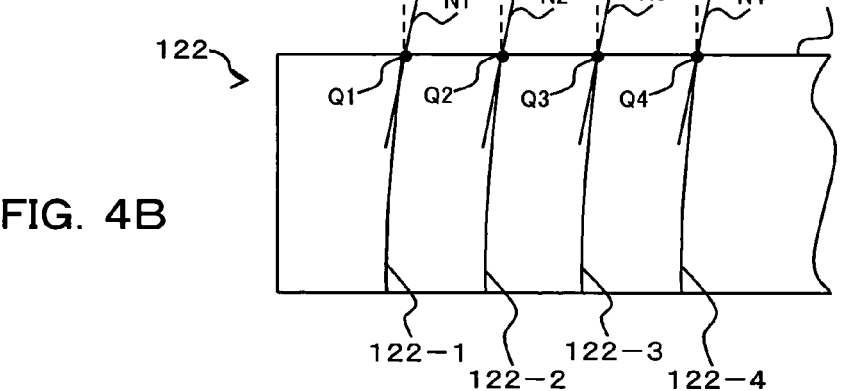
Figure 4C:
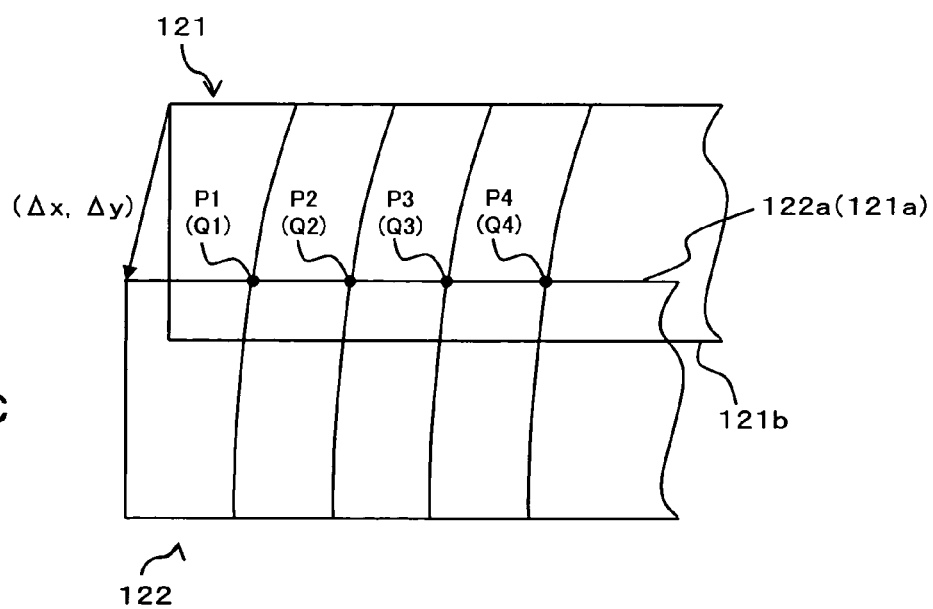

[1-2-3] Second Example of the Relative Positional Relationship Detection Process of Partial Images FIGS. 4A to 4C are diagrammatic views illustrating a second example of the relative positional relationship detection process of partial images in the first embodiment. In the second example, the sweep image positional relationship detection section 14 performs relative position detection using skeleton line images extracted from fingerprint partial images by the skeleton line extraction section 13.

Where a skeleton line image 121 shown in FIG. 4A is extracted and then another skeleton line image 122 shown in FIG. 4B is extracted by the skeleton line extraction section 13, a relative positional relationship between the skeleton line images 121 and 122 is detected, similarly as in the method described above with reference to FIGS. 3A to 3C, by the detection section 14 in the following manner. Here, at least four skeleton lines 121-1 to 121-4 are included in the skeleton line image 121 shown in FIG. 4A, and four skeleton lines 122-1 to 122-4 which are estimated that they continue from the skeleton lines 121-1 to 121-4, respectively, are included in the skeleton line image 122 shown in FIG. 4B.

The detection section 14 detects positions of the skeleton lines at an upper side image end 122a of the skeleton line image 122 extracted in the present cycle and detects tangential lines to the skeleton lines at the positions. In FIG. 4B, reference characters Q1 to Q4 denote positions of the skeleton lines 122-1 to 122-4 at the upper side image end 122a, and reference characters N1 to N4 denote the tangential lines along the skeleton lines 122-1 to 122-4 at the positions Q1 to Q4, respectively.

On the other hand, as shown in FIG. 4A, the detection section 14 scans the skeleton line image 121 in upward and downward directions with a searching line (connection line) 121a to detect positions of the skeleton lines on the searching line 121a and detects tangential lines to the skeleton lines at the positions. In FIG. 4A, reference characters P1 to P4 denote positions of the skeleton lines 121-1 to 121-4 on the searching line 121a, and reference characters M1 to M4 denote the tangential lines along the skeleton lines 121-1 to 121-4 at the positions P1 to P4, respectively.

Thereafter, the detection section 14 compares the positions Q1 to Q4 and the tangent lines N1 to N4 at the upper side image end 122a of the skeleton line image 122 and the positions P1 to P4 and the tangent lines M1 to M4 on the searching line 121a with each other, respectively. As a result of the comparison, where the distances between the positions P1 to P4 on the searching line 121a are coincident with those between the positions Q1 to Q4 at the upper side image end 122a and the variations (differences) from directions of the tangent lines M1 to M4 on the searching line 121a to the tangent lines N1 to N4 at the upper side image end 122a are smooth, the searching line 121a is adopted as a connectional position.

Here, it is defined that, for example, "that the variation from a direction of the tangential line M1 on the searching line 121a to a direction of the tangential line N1 at the upper side image end 122a is smooth" is a state wherein the variation amount from the direction of the tangential line M1 to the direction of the tangential line N1 has a predetermined value or less, or the variation amount is substantially equal to that between directions of the tangential lines around the connection points (positions P1, Q1).

The detection section 14 scans the skeleton line image 121 in the upward and downward directions with the searching line 121a to search for a position of the connection line 121a which satisfies such a condition as described above.

A positional relationship of superposition (a relative positional relationship) between the skeleton line images 121 and 122 is detected as vector data (Δx, Δy) as shown in FIG. 4C based on the position of the combination line 121a searched out as just described and the positions P1 to P4 (Q1 to Q4) on the connection line 111a.

It is to be noted that, also in the second example, searching for a connectional position in the skeleton line image 121 is performed after the positions Q1 to Q4 and the tangent lines N1 to N4 at the upper side image end 122a of the skeleton line image 122 are detected. Alternatively, however, positions of the skeleton lines at the positions at a lower side image end 121*b* of the skeleton line image 121 and the tangent lines may be detected, and thereafter, searching for a connectional position in the skeleton line image 122 may be performed with a result of the detection similarly as in the example described above.

[1-2-4] First Example of the Organism Characteristic Data Acquiring Process

FIGS. 5A to 10 are views illustrating a first example of the organism characteristic data acquiring process in the first embodiment. The first example of the organism characteristic data acquiring process at steps S11-*i*, S12-*i*, and S13 is described with reference to FIGS. 5A to 10.

If sweep images (raw images) 1, 2, 3 shown in FIGS. 5A to 5C, are fetched by the fingerprint sensor 11, respectively, then processes are performed for the sweep images 1 to 3 and characteristic portion data are extracted from the sweep images 1 to 3. In particular, an image process is first performed for the sweep images 1 to 3 by the skeleton line extraction section 13 to extract skeleton lines of fingerprint ridges. At this time, as an extraction method of a skeleton line, for example, a method wherein a thinning process is performed after a binarization process is performed or a like method is available. Skeleton line images obtained from the sweep images 1 to 3 shown in FIGS. 5A to 5C are shown in FIGS. 6A to 6C, respectively.

Then, in each of the skeleton line images, a break (hereinafter referred to as ridge end) at an image end of each ridge (skeleton line) which may connect in time to a next sweep image is determined as characteristic data, and identifiers (ID) are applied to the obtained ridge ends by the characteristic portion data extraction section 15. In FIGS. 6A to 6C, each ridge end is indicated by a blank circle, and the identifiers applied to the ridge ends are indicated by reference numerals (1 to 23).

Further, in each of the skeleton line images, an endpoint and a branch point (they are hereinafter referred to commonly as minutiae) of a ridge (skeleton line) is extracted by the characteristic portion data extraction section 15. Minutiae extracted from the skeleton line images shown in FIGS. 6A to 6C are each indicated by a black circle in FIGS. 7A to 7C.

The sweep image positional relationship detection section 14 calculates a relative positional relationship of fingerprint sweep images (or skeleton line images) different in time from each other with the method described hereinabove with reference to FIGS. 3A to 3C or 4A to 4C simultaneously when minutiae are extracted. It is to be noted that, in the present embodiment, such a searching process as described above is performed in order to detect a relative positional relationship. Alternatively, however, a finger moving vector detection apparatus (encoder) for detecting a moving amount and a moving direction of a finger may be attached as the sweep image positional relationship detection section 14 to the sweep type fingerprint sensor 11 such that vector information which represents a relative positional relationship of fingerprint sweep images (or skeleton line images) is physically detected by the finger moving vector detection apparatus.

If a relative positional relationship of sweep images for smoothly connecting ridges can be detected, then the characteristic portion data extraction section 15 can grasp at what positions in a next fingerprint sweep image (actually, skeleton line image) ridge ends 1 to 23 shown in FIGS. 6A to 7C exist. In particular, as shown in FIGS. 8A to 8C, a relationship between the ridge ends at an image end and the minutiae can be recognized.

Figure 8C:
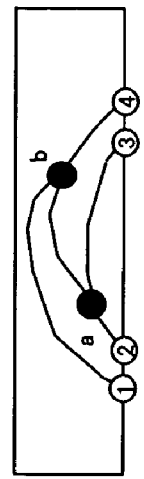
Figure 8B:
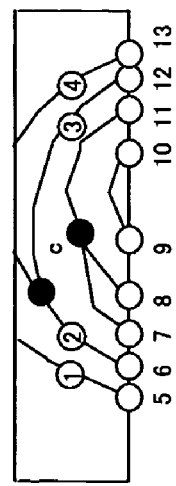
Figure 8A:
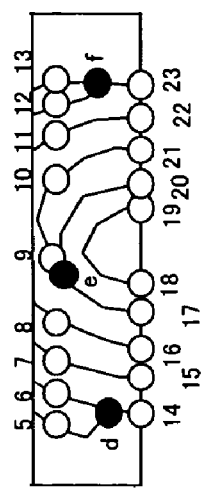

It is to be noted that, as shown in FIGS. 8A to 8C, identifiers (ID) a to f are applied also to the minutiae by the characteristic portion data extraction section 15. However, those minutiae are ignored which exist in a superposition area between a sweep image which exists prior in time to a noticed sweep image and the noticed sweep image.

For example, an upper area than the ridge ends 1 to 4 in an image (sweep image 2) shown in FIG. 8B is a superposition area (common area) between the image and another image (sweep image 1) shown in FIG. 8A, and minutiae which exist in the superposition area are the same as the minutia to which the identifier a is added in the image shown in FIG. 8A. Accordingly, as information regarding the minutiae which exist in the area, information regarding the minutiae extracted in the image shown in FIG. 8A is used, and the minutiae which exist in the common area of the sweep image 2 are ignored.

Next, the characteristic portion data extraction section 15 extracts, as characteristic portion data, connectional relationship information (a connection data table) of minutiae and ridge ends shown in FIGS. 9A to 9C from the images shown in FIGS. 8A to 8C using the identifiers applied to the minutiae and ridge ends. In the connectional relationship information (connection data table), a connectional relationship between minutiae through a ridge, a connectional relationship between ridge ends through a ridge and a connectional relationship between a minutia and a ridge end through a ridge are recorded using the identifiers.

For example, in the connection data table shown in FIG. 9A, pairs of the identifiers of the minutiae and ridge ends which are in a connectional relationship through ridges in the image shown in FIG. 8A, that is, (1, b), (2, a), (a, b), (3, a) and (4, b), are recorded. Similarly, in the connection data table shown in FIG. 9B, pairs of the identifiers of the minutiae and ridge ends which are in a connectional relationship through ridges in the image shown in FIG. 8A, that is, (1, 5), (2, 6), (7, c), (8, c), (9, 10), (11, c), (3, 12) and (4, 13), are recorded. Further, in the connection data table shown in FIG. 9C, pairs of the identifiers of the minutiae and ridge ends which are in a connectional relationship through ridges in the image shown in FIG. 8C, that is, (5, b), (6, d), (7, 15), (8, 16), (9, e), (e, 17), (18, 19), (e, 20), (10, 21), (11, 22), (12, f), (13, f), (23, f) and (14, d), are recorded.

Finally, the characteristic portion data synthesis section 17 synthesizes two or more characteristic portion data (the connection data table) to produce wide-range fingerprint data (that is, minutia connection information regarding minutiae of the entire fingerprint). In the present embodiment, fingerprint data is defined as a connectional relationship between minutiae through a ridge. More particularly, the characteristic portion data synthesis section 17 refers to the connection data tables extracted for the individual fingerprint sweep images shown in FIGS. 9A to 9C to follow or trace the connectional relationships (identifiers of ridge ends) in the connection data tables to synthesize the connectional relationship between the minutiae as shown in FIG. 10.

For example, by following or tracing connectional relationships at the uppermost stage of the connection data tables shown in FIGS. 9A to 9C, it can be recognized that "the minutia b is connected to the ridge end 1", "the ridge end 1 is connected to the ridge end 5", and "the ridge end 5 is connected to the minutia d". Then, from such connectional relationships as just described, a fact that "the minutiae b and d are connected to each other" is finally recognized. In particular, by following the connectional relationships at the uppermost stage of the connection data tables shown in FIGS. 9A to 9C, fingerprint data which indicates the fact that "the minutiae b and d are connected to each other" can be synthesized. A result of the synthesis is recorded as a pair of identifiers (b, d) at the uppermost stage of a connectional relationship table shown in FIG. 10. Similarly, by following the connectional relationships regarding all of the minutiae in the connection data tables shown in FIGS. 9A to 9C, connectional relationships (fingerprint data) of the minutiae are synthesized, and finally, such a connectional relationship table as shown in FIG. 10, that is, fingerprint data (organism characteristic data), can be obtained.

[1-2-5] Second Example of the Organism Characteristic Data Acquiring Process

FIGS. 11A to 16 are views illustrating a second example of the organism characteristic data acquiring process in the first embodiment. The second example of the organism characteristic data acquiring process at steps S11-$i$, S12-$i$ and S13 is described with reference to FIGS. 11A to 16. Also in the second example, the organism characteristic data acquiring process is performed similarly as in the first example described with reference to FIGS. 5A to 10. However, a representing method of characteristic portion data is different from that of the first example.

Also in the second example, if sweep images (raw images) 1, 2 and 3 shown in FIGS. 11A to 1C, respectively, are fetched by the fingerprint sensor 11, then processes are performed for the sweep images 1 to 3 and characteristic portion data are extracted from the sweep images 1 to 3. In particular, an image process is first performed for the sweep images 1 to 3 by the skeleton line extraction section 13 to extract skeleton lines of fingerprint ridges, and minutiae of the ridges (skeleton lines) are extracted from the skeleton line images by the characteristic portion data extraction section 15. The skeleton line images and minutiae (black circle) obtained from the sweep images 1 to 3 shown in FIGS. 11A to 11C are shown in FIGS. 12A to 12C, respectively.

Then, identifiers are applied to ridges interrupted by minutiae. At this time, connection information of ridges of fingerprint sweep images (or skeleton line images) different in time from each other is detected by the sweep image positional relationship detection section 14. Thereafter, an identifier is applied to ridges same as each other which exist across sweep images different from each other to acquire a correlation, and the correlation of the ridges is detected as a relative positional relationship. For example, as shown in FIGS. 13A to 13C, identifiers 1 to 13 are applied to ridges on the skeleton line images shown in FIGS. 12A to 12C.

Figure 12C:
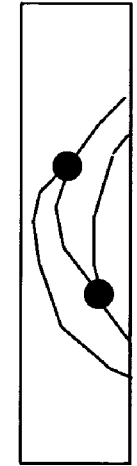
Figure 12B:
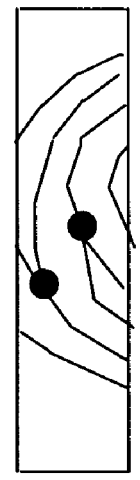
Figure 12A:
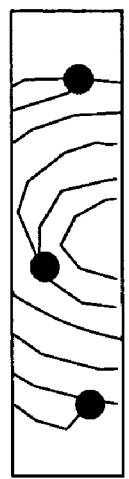
Figure 13C:
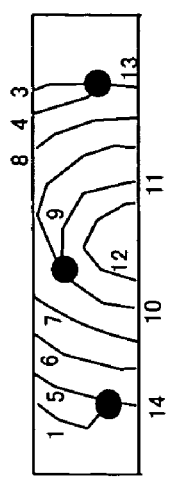
Figure 13B:
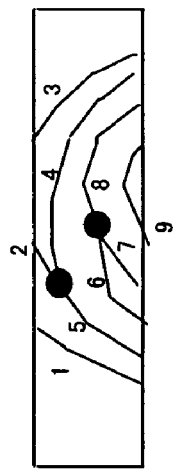
Figure 13A:
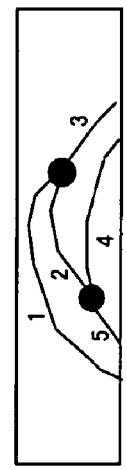
Figure 14C:
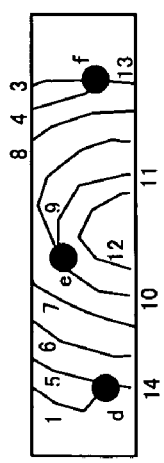
Figure 14B:
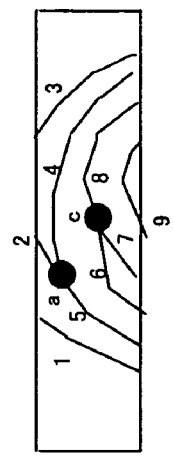
Figure 14A:
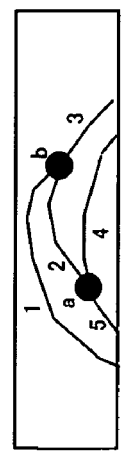

Further, for example, as shown in FIGS. 14A to 14C, identifiers a to f are applied to the minutiae on the skeleton line images shown in FIGS. 12A to 12C by the characteristic portion data extraction section 15. At this time, similarly to the identifiers of the ridges, an identifier is applied to minutiae same as each other which exist across sweep images different from each other. The minutiae same as each other which exist across the sweep images different from each other can be discriminated based on the identifiers 1 to 13 applied to the ridges.

Then, the characteristic portion data extraction section 15 extracts, as characteristic portion data, connection data tables [tables including pairs (connectional relationship information between minutiae and ridges) of minutiae and ridge ends which are in a connectional relationship with each other] shown in FIGS. 15A to 15C from the images shown in FIGS. 14A to 14C using the identifiers applied to the minutiae and ridges. In those connection data tables, relationships between minutiae which exist on the images and ridges connected to the minutiae are recorded using identifiers.

For example, in the connection data table shown in FIG. 15A, pairs of identifiers of the minutiae and ridges which are in a connectional relationship in the image shown in FIG. 14A, that is, (b, 1), (b, 2), (b, 3), (a, 2), (a, 5) and (a, 4), are recorded. Similarly, in the connection data table shown in FIG. 15B, pairs of identifiers of the minutiae and ridges which are in a connectional relationship in the image shown in FIG. 14B, that is, (a, 2), (a, 5), (a, 4), (c, 6), (c, 7) and (c, 8), are recorded. Further, in the connection data table shown in FIG. 15C, pairs of identifiers of the minutiae and ridges which are in a connectional relationship in the image shown in FIG. 14C, that is, (d, 1), (d, 5), (d, 14), (e, 9), (e, 10), (e, 11), (f, 3), (f, 4) and (f, 13), are recorded.

Finally, the characteristic portion data synthesis section 17 synthesizes two or more characteristic portion data (the connection data tables) to produce wide-range fingerprint data (that is, minutia connection information regarding minutiae of the entire fingerprint). In the present embodiment, as described above, fingerprint data is defined as a connectional relationship between minutiae through a ridge. More particularly, the characteristic portion data synthesis section 17 refers to the connection data tables extracted for the individual fingerprint sweep images shown in FIGS. 15A to 15C to follow the connectional relationships (identifiers of ridge ends) in the connection data tables to synthesize the connectional relationship between the minutiae as shown in FIG. 16. It is to be noted that the identifiers of the minutiae which are enclosed by parentheses in FIG. 16 are redundant information and originally are not necessary for recording.

Here, the conventional technique disclosed in the Japanese Patent Laid-Open No. 91769/1998 and so forth has an object that, by finally connecting a plurality of fingerprint partial images to each other, the entire fingerprint image similar to that acquired by a plane type fingerprint sensor (which is a common fingerprint sensor different from that of the sweep type) is reconfigured. Therefore, high detection accuracy is required in order that a relative positional relationship of a plurality of fingerprint partial images maybe detected. Accordingly, for example, expansion and contraction appears on a picked-up image due to a relative speed which occurs between a scanning line of the sweep type fingerprint sensor 11 and a finger during moving. Therefore, the expansion and contraction must be corrected, or correlation calculation for detecting a superposition position must be performed minutely in a unit of 1 pixel.

However, in the second example of the organism characteristic data acquiring process described above, if it is decided which ridges from among fingerprint ridges in a plurality of fingerprint partial images are same as each other, then a relative positional relationship of a plurality of fingerprint partial images can be grasped. Therefore, such high detection accuracy as in the conventional technique is not required. In particular, correction of expansion and contraction of a fingerprint image need not be performed, and the calculation amount of correlation calculation can be reduced. Therefore, the resolution of fingerprint partial images can be reduced to one half. Accordingly, if a relative positional relationship between two fingerprint partial images is detected not as vectors shown in FIGS. 3C and 4C but as a simple correlation between ridges same as each other, then an algorism which is simple and has a high processing speed can be utilized.

[1-3] Effects of the First Embodiment

With the first embodiment of the present invention, every time a rectangular fingerprint partial image is sampled from a finger of an object person of identification, a process for detecting a relative positional relationship of the fingerprint partial image, a process for extracting characteristic portion data from the fingerprint partial image and a process for synthesizing the extracted characteristic portion data are performed. Therefore, every time a fingerprint partial image is sampled, organism characteristic data (characteristic portion data) in the fingerprint partial image can be obtained without producing the entire fingerprint image (full image) from a plurality of fingerprint partial images.

In particular, not organism characteristic data (fingerprint data including minutia information) necessary for personal identification and so forth is extracted by producing the entire fingerprint image and thereafter performing image processes for it but each of fingerprint partial images is considered as an object of the image processes and characteristic portion data is acquired at any time from the fingerprint partial image. Therefore, the memory capacity necessary for image processes can be drastically reduced in comparison with that of the conventional technique disclosed in the Japanese Patent Laid-Open No. 91769/1998 and so forth mentioned hereinabove.

Further, a characteristic extraction process is started without producing the entire image, and as a result, the characteristic extraction process can be allocated to a CPU in parallel to the I/O process of the fingerprint sensor 11 to cause the CPU to perform them. Therefore, the CPU can be utilized very effectively in comparison with that of the conventional technique disclosed in Japanese Patent Laid-Open No. 91769/1998 and so forth mentioned hereinabove.

On the other hand, as described hereinabove with reference to FIGS. 5A to 10, by extracting, as characteristic portion data, connectional relationship information between a minutia and a ridge end at an image end of a fingerprint partial image from each of fingerprint partial images, only if the connectional relationship information (identifiers of ridge ends) in the fingerprint partial images is followed, then fingerprint data (that is, a connectional relationship between minutiae included in a plurality of fingerprint partial images) including minutia information over a wide range can be synthesized. At this time, if an identifier is applied to minutiae same as each other or ridge ends same as each other which commonly exist in a plurality of fingerprint partial images, then connectional relationship information in the fingerprint partial images can be easily followed, and a connectional relationship between minutiae included in a plurality of fingerprint partial images can be obtained very easily.

Further, as described hereinabove with reference to FIGS. 11A to 16, also by extracting, as characteristic portion data, connectional relationship information between a minutia and a ridge connected to the minutia from each of fingerprint partial images, only if the connectional relationship information (identifiers of ridge ends) in the fingerprint partial images is followed, then fingerprint data (that is, a connectional relationship between minutiae same as each other included in a plurality of fingerprint partial images) including minutia information over a wide range can be synthesized. At this time, if an identifier is applied to minutiae same as each other or ridges same as each other which commonly exist in a plurality of fingerprint partial images, then connectional relationship information in the fingerprint partial images can be easily followed, and a connectional relationship between minutiae included in a plurality of fingerprint partial images can be obtained very easily.

Further, by detecting, as a relative positional relationship between two fingerprint partial images different in time from each other, such a superposition positional relationship that ridges same as each other in the fingerprint partial images are smoothly connected to each other and a correlation between the ridges same as each other in the partial images, a mutual relative positional relationship between a plurality of fingerprint partial images can be grasped easily, and characteristic portion data can be synthesized easily using the relative positional relationship.

Further, as described hereinabove, fingerprint data (which is stored in the fingerprint data storage section 18) acquired by the organism characteristic data acquiring apparatus 10 and fingerprint data regarding an object person of identification registered in advance in the registration fingerprint data storage section 20 are compared and collated with each other by the collation section 30 to perform personal identification of an object person of identification. Therefore, personal identification having high reliability can be performed at a high speed using the sweep type fingerprint sensor 11.

[2] Second Embodiment

Figure 17:
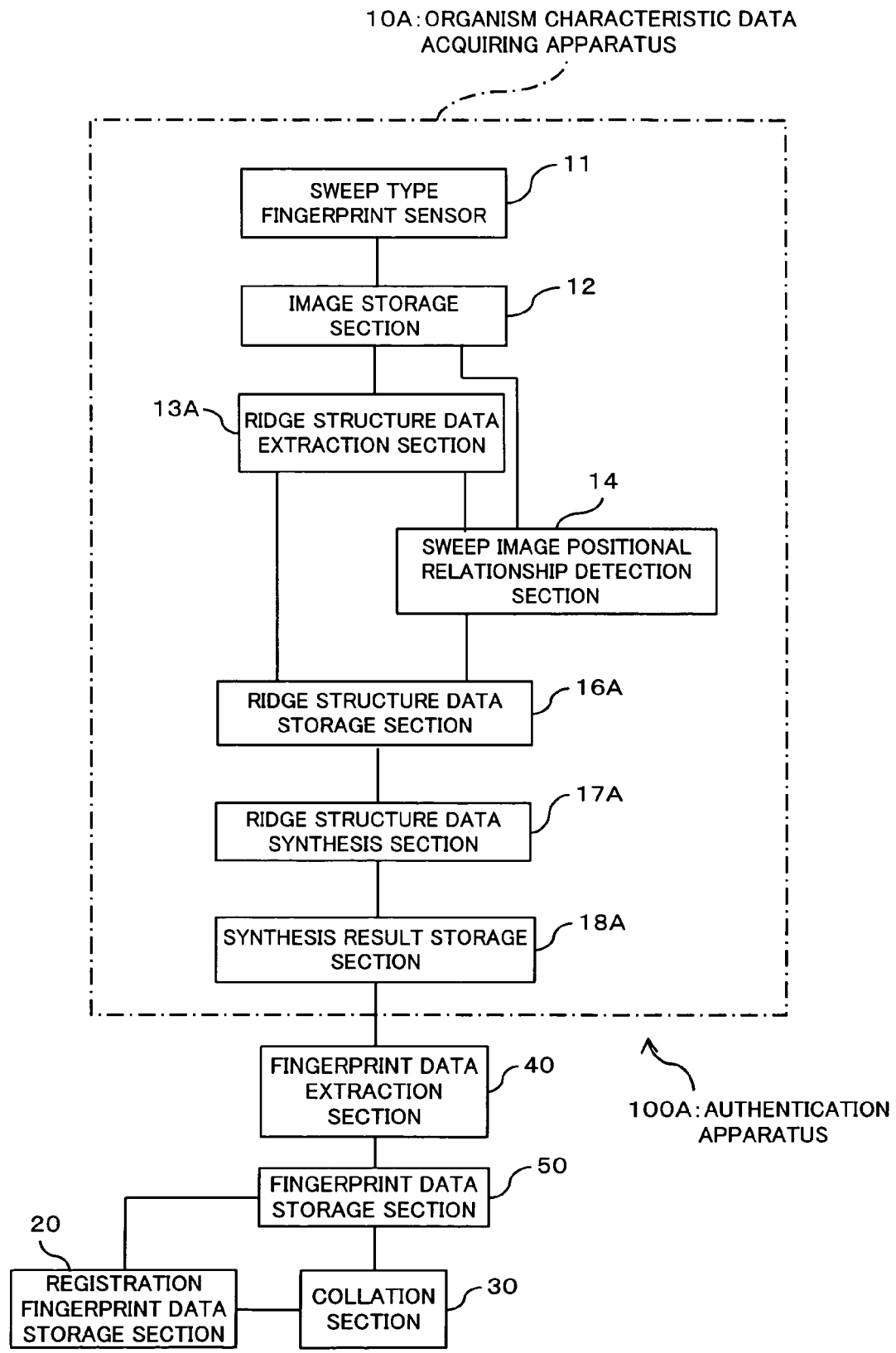
FIG. 17 is a block diagram showing a configuration of an organism characteristic data acquiring apparatus and an authentication apparatus according to a second embodiment of the present invention.

[2-1] Configuration of the Organism Characteristic Data Acquiring Apparatus and the Authentication Apparatus of the Second Embodiment FIG. 17 is a block diagram showing a configuration of an organism characteristic data acquiring apparatus and an authentication apparatus according to a second embodiment of the present invention. It is to be noted that, in FIG. 17, like elements to those of the first embodiment are denoted by like reference characters or substantial like reference characters, and detailed description of them is omitted herein to avoid redundancy.

Similarly to the authentication apparatus 100 of the first embodiment, also the authentication apparatus 100A of the second embodiment shown in FIG. 17 performs personal identification using a fingerprint as organism information and includes an organism characteristic data acquiring section 10A, a registration fingerprint data storage section 20, a collation section 30, a fingerprint data extraction section 40 and a fingerprint data storage section 50.

The organism characteristic data acquiring apparatus 10A in the second embodiment acquires ridge structure data (image data just before extraction of fingerprint data including minutia information) as organism characteristic data necessary for personal identification from an object person of identification. The organism characteristic data acquiring apparatus 10A includes a sweep type fingerprint sensor 11, an image storage section 12, a ridge structure data extraction section 13A, a sweep image positional relationship detection section 14, a ridge structure data storage section 16A, a ridge structure data synthesis section 17A and a synthesis result storage section 18A.

Actually, also the organism characteristic data acquiring section 10A and the authentication apparatus 100A of the second embodiment are implemented, similarly as in the first embodiment, by combining the sweep type fingerprint sensor 11 with a general personal computer having a CPU, a ROM, a RAM and other necessary apparatus. At this time, functions as the ridge structure data extraction section 13A, sweep image positional relationship detection section 14, ridge structure data storage section 16A and ridge structure data synthesis section 17A are implemented by executing a predetermined program (organism characteristic data acquiring program) by means of a CPU (computer). Further, also functions as the collation section 30 and the fingerprint data extraction section 40 are implemented by executing a predetermined program (collation program) by means of the CPU. On the other hand, functions as the image storage section 12, characteristic portion data storage section 16A and synthesis result storage section 18A are implemented by the RAM. Further, a function as the registration fingerprint data storage section 30 is implemented by the RAM or ROM. It is to be noted that functions as the storage sections 12, 16A, 18A and 30 may otherwise be implemented by a storage apparatus such as a hard disk built in a personal computer or an external storage apparatus.

Similarly as in the first embodiment, the organism characteristic data acquiring program and the collation program described above are recorded in a computer-readable recording medium such as, for example, a flexible disk and a CD-ROM and are provided as such. In the present embodiment, the organism characteristic data acquiring program and the collation program are stored in advance in the ROM, and the programs are read out from the ROM into and executed by the CPU. It is to be noted that the programs may be handled such that they are stored in advance in a storage apparatus (recording medium) such as, for example, a magnetic disk, an optical disk or a magneto-optical disk and are provided to a computer (CPU) from the storage apparatus through a communication path.

In the second embodiment, the ridge structure data extraction section (extraction section) 13A extracts, every time a single fingerprint partial image (a single rectangular sweep image) is sampled by the fingerprint sensor 11 and is stored into the image storage section 12, ridge structure data including characteristic information unique to a fingerprint from the fingerprint partial image. Here, the ridge structure data extraction section 13A performs, similarly to the skeleton line extraction section 13 of the first embodiment, a binarization process and a thinning process for each of fingerprint partial images and extracts a skeleton line (a skeleton image as ridge structure data) of a fingerprint ridge.

The ridge structure data storage section 16A stores skeleton line images (ridge structure data) obtained from fingerprint partial images by the ridge structure data extraction section 13A and a relative positional relationship (which is detected by the detection section 14) between each of fingerprint partial images and a fingerprint partial image sampled at a directly previous timing.

The characteristic portion data synthesis section (synthesis section) 17A synthesizes, every time a single fingerprint partial image (a single rectangular sweep image) is sampled by the fingerprint sensor 11, characteristic portion data of the fingerprint partial image sampled in the present cycle and ridge structure data regarding another fingerprint partial image extracted prior based on a relative positional relationship between the fingerprint partial image sampled in the present cycle and the fingerprint partial image sampled in the preceding cycle. Then, the characteristic portion data synthesis section 17 outputs a result of the synthesis as fingerprint data (organism characteristic data of the organism portion). In particular, the characteristic portion data synthesis section 17 synthesizes a great number of obtained fingerprint characteristic portion data to produce a single set of fingerprint data. Here, as described above, the relative positional relationship is detected by the detection section 14 and is stored in the characteristic portion data storage section 16A. Further, as described above, the characteristic portion data are extracted by the characteristic portion data extraction section 15 and are stored in the characteristic portion data storage section 16A.

The synthesis result storage section 18A stores a skeleton line image of an entire fingerprint obtained by the ridge structure data synthesis section 17A.

The fingerprint data extraction section (characteristic data extraction section) 40 extracts characteristic data unique to a fingerprint acquired by the organism characteristic data acquiring apparatus 10, that is, fingerprint data regarding a minutia, from a skeleton line image (which is stored in the synthesis result storage section 18A) of the entire fingerprint.

The fingerprint data storage section 50 stores fingerprint data extracted by the fingerprint data extraction section 40.

Further, the registration fingerprint data storage section 20 retains fingerprint data registered in advance regarding an object person of identification. The fingerprint data retained by the registration fingerprint data storage section 20 maybe data acquired by the organism characteristic data acquiring apparatus 10 of the first embodiment, data extracted by the fingerprint data extraction section 40 from a skeleton line image acquired by the organism characteristic data acquiring apparatus 10A of the second embodiment, or data acquired using another fingerprint sensor.

Further, the collation section 30 in the second embodiment compares fingerprint data (which is stored in the fingerprint data storage section 50) extracted by the fingerprint data extraction section 40 and fingerprint data registered in advance in the registration fingerprint data storage section 20 regarding an object person of identification with each other to perform a collation process to perform personal authentication of an object person of identification.

It is to be noted that, while, in the second embodiment, a skeleton line image is extracted as ridge structure data by the ridge structure data extraction section 13A, a binarization image obtained by binarizing an image of a ridge may alternatively be extracted as ridge structure data. In this instance, however, the fingerprint data extraction section 40 first performs a thinning process for the binarization image extracted by the ridge structure data extraction section 13A to acquire a skeleton line image, and then extracts a minutia from the acquired skeleton line image.

[2-2] Operation of the Second Embodiment

Figure 18:
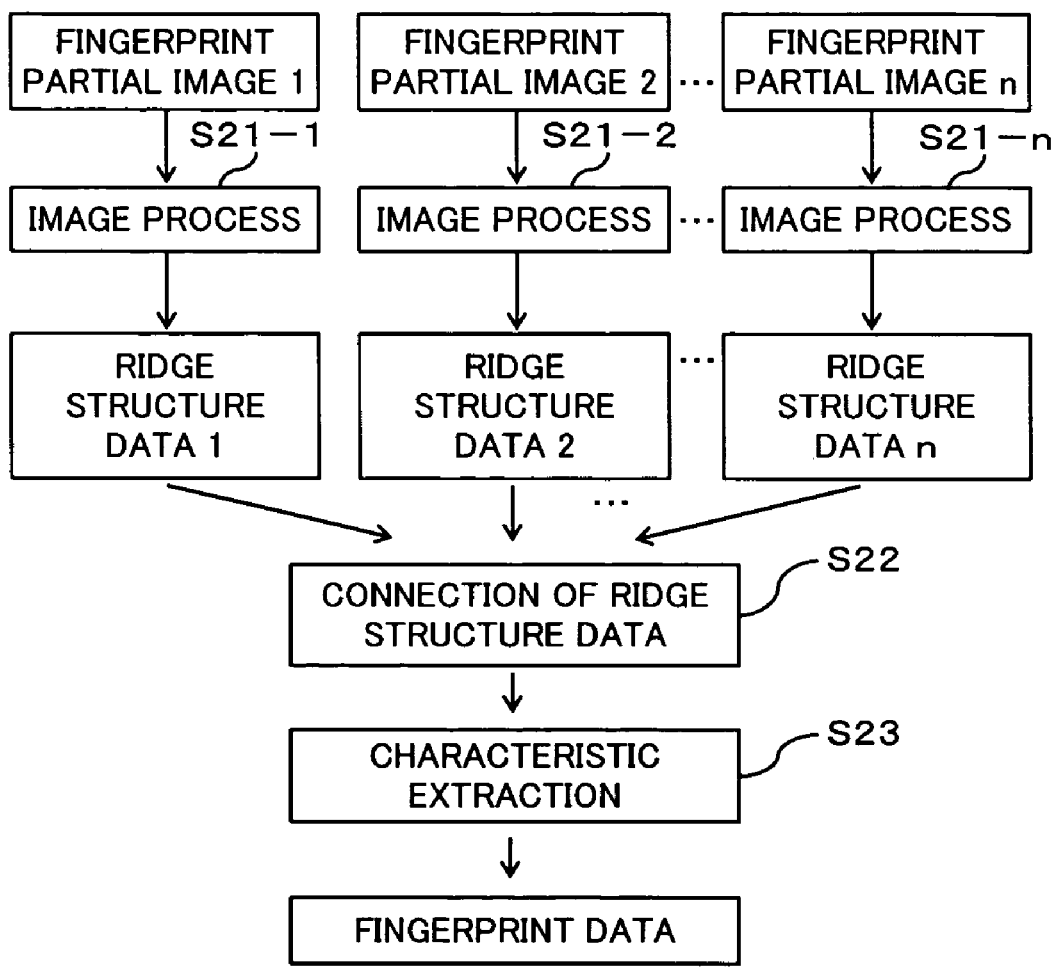
FIG. 18 is a flow chart illustrating an organism characteristic data acquiring procedure according to the second embodiment.

Operation of the organism characteristic data acquiring apparatus 10A and authentication apparatus 100A of the second embodiment configured as described above is described below with reference to FIGS. 18 to 21. It is to be noted that FIG. 18 is a flow chart illustrating an organism characteristic data acquiring procedure in the second embodiment, and FIGS. 19A to 21 are diagrammatic views illustrating organism characteristic data acquiring operation in the second embodiment.

The organism characteristic data acquiring procedure in the second embodiment is described with reference to a flow chart shown in FIG. 18.

Similarly as in the first embodiment, if an object person of identification slidably moves a finger thereof from the fingertip side to the finger root side (first joint side) on the sensor face of the sweep type fingerprint sensor 11, then such a plurality of rectangular fingerprint partial images 1, 2, . . . , n as shown in FIGS. 19A to 19C are successively sampled (sampling step). But, in FIGS. 19A to 21, fingerprint images in a case wherein n is 3 (n=3) are shown.

Figure 20C:
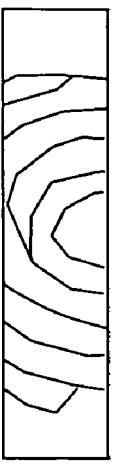
Figure 20B:
Figure 20A:

Then, in the second embodiment, every time a single rectangular fingerprint partial image is sampled, an image process is directly performed for the fingerprint partial image i (i=1, 2, . . . , n) by the ridge structure data extraction section 13A, and such ridge structure data i (skeleton line image i) as, for example, shown in FIGS. 20A to 20C is extracted (extraction step S21-i). At this time, through not shown in FIG. 18, a relative positional relationship between the fingerprint partial image i and another fingerprint partial image i-1 sampled in the preceding cycle is detected based on the fingerprint partial images i and i-1 or skeleton line images i and i-1 by the sweep image positional relationship detection section 14 (detection step). It is to be noted that skeleton line images shown in FIGS. 20A to 20C are extracted from the fingerprint partial images shown in FIGS. 19A to 19C, respectively.

Figure 21:
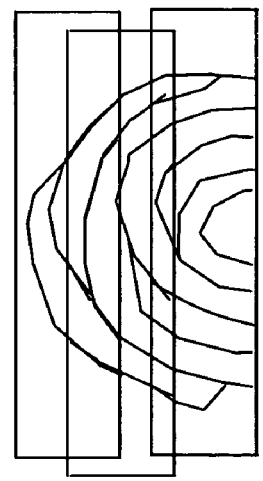

The characteristic portion data i extracted by the ridge structure data extraction section 13A is synthesized and connected to skeleton line images 1 to i-1 extracted prior from the fingerprint partial images i to i-1 based on the relative positional relationship between the fingerprint partial image i and the fingerprint partial image i-1 by the ridge structure data synthesis section 17A. If characteristic portion data n extracted from the last fingerprint partial image n is synthesized and connected, then the synthesis/connection process is completed, and, for example, such a skeleton line image of the entire fingerprint as shown in FIG. 21 is outputted as a result of the synthesis (synthesis step S22). It is to be noted that the skeleton line image of the entire fingerprint shown in FIG. 21 is obtained by synthesis of the three skeleton line images shown in FIGS. 20A to 20C.

Then, finger print data is extracted by the fingerprint data extraction section 40 from the skeleton line image of the entire fingerprint acquired by the organism characteristic data acquiring apparatus 10A as described above (step S23). Thereafter, the fingerprint data (fingerprint data stored in the fingerprint data storage section 50) and the fingerprint data registered in advance in the registration fingerprint data storage section 20 regarding an object person of identification are compared and collated with each other by the collation section 30 to perform personal authentication of the object person of identification.

[2-3] Effects of the Second Embodiment

In contrast with the conventional method wherein skeleton lines are extracted from an entire fingerprint image obtained by connecting raw fingerprint partial images, in the second embodiment of the present invention, skeleton lines (ridge structure data) are extracted immediately at a point of time when a fingerprint partial image is obtained, and then such skeleton line images obtained for different fingerprint partial images are synthesized to acquire a skeleton line image (ridge structure data over a wide range) of the entire fingerprint as organism characteristic data.

Usually, various image processes (a binarization process, a thinning process and so forth) are performed in order to remove cracks, adhesions and noise in a ridge image to correctly extract a skeleton line image. However, in the second embodiment, not such image processes as described above are applied to an entire fingerprint image, but every time a fingerprint partial image is sampled by the fingerprint sensor 11, such image processes as described above are applied to the fingerprint partial image. Consequently, the memory capacity necessary for image processing can be reduced significantly.

Further, since image processes which apply a high load to a CPU are started without producing an entire image, an operation (I/O process) for fetching a fingerprint partial image by means of the fingerprint image sensor 11 and an image process for another fingerprint partial image fetched prior are executed in parallel to each other. Consequently, the CPU can be utilized very effectively.

Furthermore, also in the second embodiment, fingerprint data (which is stored in the fingerprint data storage section 50) extracted from a skeleton line image of an entire fingerprint acquired by the organism characteristic data acquiring apparatus 10A and fingerprint data regarding an object person of identification registered in advance in the registration fingerprint data storage section 20 are compared and collated with each other by the collation section 30 to perform personal identification of an object person of identification as described hereinabove. Therefore, personal identification having high reliability can be performed at a high speed using the sweep type fingerprint sensor 11.

[3] Others

It is to be noted that the present invention is not limited to the embodiments specifically described above, and variations and modifications can be made without departing from the scope of the present invention.

For example, in the embodiments described above, an organism portion is a finger, and fingerprint data or ridge structure data is extracted as organism characteristic data. However, the present invention is not limited to this, but can be applied similarly also where organism characteristic data is acquired from organism information such as, for example, a palmar pattern, a blood vessel pattern (fundus retina vasoganglion, vein vasoganglion) or an iris muscle pattern. Also in this instance, operation and advantages similar to those of the embodiments described above can be achieved.

Incidentally, the following two methods are available for sampling two or more fingerprint partial images by means of the fingerprint sensor 11.

(i) While a finger is moved, it is re-placed on the fingerprint sensor 11 several times to successively sample a fingerprint partial image. In particular, the fingerprint sensor 11 is configured such that it successively samples a square fingerprint partial image while a finger is re-placed several times on a sampling face (sensor face) for sampling a fingerprint partial image (refer to fingerprint partial images A to E of FIG. 22).

Figure 22:
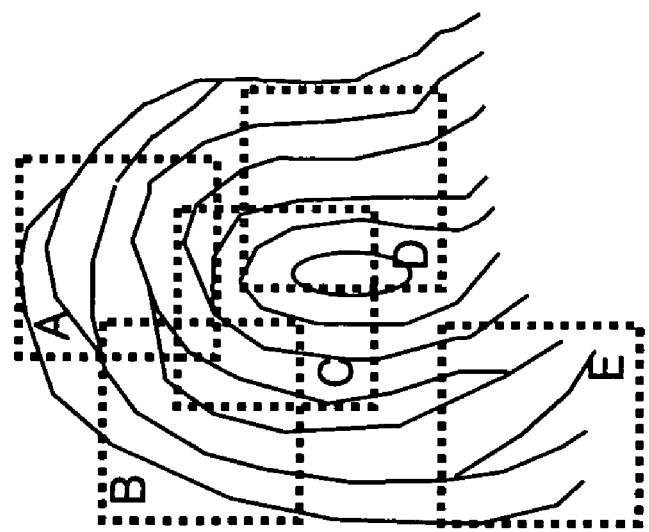
FIG. 22 is a schematic diagrammatic view showing a first example of partial images which make an object of a synthesis process and partial images which do not make an object of the synthesis process in the second embodiment.

(ii) A fingerprint partial image is successively sampled while a finger is slidably moved on the fingerprint sensor 11. In particular, the fingerprint sensor 11 is configured such that it successively samples a rectangular fingerprint partial image while a finger is moved relative to a sampling face (sensor face) for sampling a fingerprint partial image (refer to fingerprint partial images a to d of FIG. 23). In FIG. 22, the fingerprint partial images A to D which make an object of a synthesis process and the fingerprint partial image E which does not make an object of a synthesis process are shown. Also in FIG. 23, the fingerprint partial images a to c which make an object of a synthesis process and the fingerprint partial image d which does not make an object of a synthesis process are shown.

Figure 23:
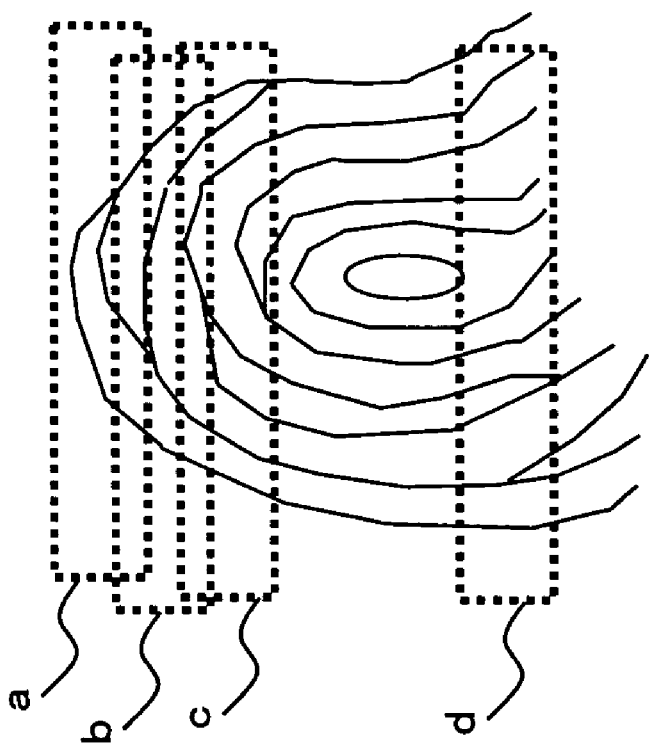
FIG. 23 is a schematic diagrammatic view showing a second example of partial images which make an object of a synthesis process and partial images which do not make an object of the synthesis process in the second embodiment.

Characteristics regarding a relative positional relationship of the fingerprint partial images obtained by the methods (i) and (ii) described above are quite different from each other as seen from FIGS. 22 and 23. However, a requirement for connection of fingerprint partial images is common whichever one of the methods (i) and (ii) is adopted. In particular, characteristic portion data regarding any fingerprint partial image which has a side commonly shared by, or has a region overlapping with, at least one of a plurality of fingerprint partial images sampled by the fingerprint sensor 11 is determined as an object of a synthesis process by the synthesis section 17 or 17A, and synthesis of minutia data or ridge structure data is performed based on such characteristic portion data by the synthesis section 17 or 17A to produce fingerprint data over a wide range.

For example, as regards the fingerprint partial images A to E shown in FIG. 22 obtained by the method (i) described above, since the fingerprint partial image combinations (A, B), (A, C), (B, C) and (C, D) exhibit an overlap of images, it is possible to grasp a relative positional relationship among the fingerprint partial images. Thus, characteristic data or ridge structure data regarding the fingerprint partial images A to D are synthesized by the synthesis section 17 or 17A. In contrast, the fingerprint partial image E does not have a region or a side which overlaps with any of the other fingerprint partial images A to D. Therefore, in the embodiments described above, minutia data or ridge structure data regarding the fingerprint partial image E is excepted from an object of synthesis by the synthesis section 17 or 17A.

If the method (ii) described above is adopted and a fingerprint partial image is successively picked up while a finger is slidably moved on the fingerprint sensor 11, then two or more fingerprint partial images can be obtained. At this time, where the fingerprint partial images have an overlap region with each other, it is possible to grasp a relative positional relationship between them, and characteristic point data or ridge structure data of them can be synthesized. If the speed at which a finger is slidably moved instantaneously becomes excessively high while a fingerprint partial image is sampled in accordance with the method (ii) described above, then fetching of a fingerprint partial image cannot be performed in time and fingerprint partial images may not have an overlapping region as seen in FIG. 23.

In the fingerprint partial image combinations (a, b) and (b, c) shown in FIG. 23, the images overlap with each other, and therefore, a relative positional relationship between them can be grasped. Thus, minutia data or ridge structure data regarding the fingerprint partial images a to c are synthesized by the synthesis section 17 or 17A. In contrast, the fingerprint partial image d does not have a region or a side which overlaps with any of the other fingerprint partial images a to c. Therefore, in the present embodiment, minutia data or ridge structure-data regarding the fingerprint partial image d is excepted from an object of synthesis by the synthesis section 17 or 17A.

As described above, a fingerprint partial image which does not have a portion commonly shared by any other fingerprint partial image does not allow obtainment of a relative positional relationship thereof with any other fingerprint partial image, and it is impossible to synthesize characteristic position data regarding the fingerprint partial image with characteristic portion data of the other fingerprint partial images. Therefore, the characteristic portion data of such a fingerprint partial image as described above is excepted from an object of the synthesis process. Consequently, it can be prevented to perform a wasteful synthesis process, and the processing efficiency can be improved.

What is claimed is:

1. An organism characteristic data acquiring apparatus for acquiring organism characteristic data, for at least one of registration organism characteristic data storage and an authentication unit for authenticating the identification object person, from an identification object person or a registration object person to authenticate the identification object person based on the organism characteristic data, comprising:
    a sampling section for successively sampling partial images of a portion of an organism from each of the identification object person and/or the registration object person, each sampled partial image having an overlapping portion shared with a previously sampled partial image sampled immediately before the sampled partial image;
    a detection section for detecting, substantially contemporaneously and subsequent to obtaining the sampled partial image by said sampling section, a relative positional relationship between the sampled partial image and the previously sampled partial image based on the overlapping portion;
    an extraction section for extracting, substantially contemporaneously and subsequent to detection of the relative positional relationship by said detection section, characteristic portion data including characteristic information unique to the organism portion from the sampled partial image; and
    a synthesis section for synthesizing, substantially contemporaneously and subsequent to extraction of the characteristic portion data by said extraction section, the characteristic portion data of the sampled partial image extracted by said extraction section and characteristic portion data of the previously sampled partial image based on the relative positional relationship of the sampled partial image detected by said detection section and outputting a result of the synthesis as organism characteristic data of the portion of the organism for the at least one of registration organism characteristic data storage and an authentication unit for authenticating the identification object person using sampled partial images forming less than an entire image of the portion of the organism sampled in said sampling.

2. The organism characteristic data acquiring apparatus as claimed in claim 1, wherein said sampling section samples a pattern formed from a ridge on the portion of the organism.

3. The organism characteristic data acquiring apparatus as claimed in claim 2, wherein said extraction section extracts, as the characteristic portion data, information regarding a characteristic point of the ridge.

4. The organism characteristic data acquiring apparatus as claimed in claim 3, wherein said extraction section extracts, as the information regarding a characteristic point of the ridge, at least one of a position, a type and a direction of the characteristic point.

5. The organism characteristic data acquiring apparatus as claimed in claim 3, wherein said extraction section extracts, as the characteristic portion data, a position of a sweat gland which exists on the ridge.

6. The organism characteristic data acquiring apparatus as claimed in claim 3, wherein said extraction section extracts, as the characteristic portion data, a number of sweat glands which exist between the characteristic points on the ridge.

7. The organism characteristic data acquiring apparatus as claimed in claim 3, wherein said extraction section extracts, as the characteristic portion data, a position of a ridge end which is at an end of the sampled partial image.

8. The organism characteristic data acquiring apparatus as claimed in claim 7, wherein said extraction section extracts, as the characteristic portion data, information of a connectional relationship between the characteristic point and the ridge end.

9. The organism characteristic data acquiring apparatus as claimed in claim 2, wherein said extraction section extracts, as the ridge structure data, a skeleton line image obtained by thinning the image of the ridge.

10. The organism characteristic data acquiring apparatus as claimed in claim 2, wherein said extraction section extracts, as the ridge structure data, a binary image obtained by binarizing the image of the ridge.

11. The organism characteristic data acquiring apparatus as claimed in claim 2, wherein said detection section detects, as the relative positional relationship, a positional relationship of superposition between the sampled partial image and the previously sampled partial image such that ridges same as each other in the sampled partial image and the previously sampled partial image are smoothly connected to each other.

12. The organism characteristic data acquiring apparatus as claimed in claim 2, wherein said detection section detects, as the relative positional relationship, a corresponding relationship of the ridges same as each other in the sampled partial image and the previously sampled partial image.

13. The organism characteristic data acquiring apparatus as claimed in claim 1, wherein said sampling section obtains the sampled partial image by replacing the organism portion on a sampling face by a plural number of times for sampling a partial image, and wherein characteristic portion data regarding one of the partial images, having an area which has a side shared by or overlapping at least one other of the partial images sampled by said sampling section, is used as an object of the synthesizing process by said synthesis section.

14. The organism characteristic data acquiring apparatus as claimed in claim 2, wherein said sampling section obtains the sampled partial image by replacing the organism portion on a sampling face by a plural number of times for sampling a partial image, and wherein characteristic portion data regarding one of the partial images, having an area which has a side shared by or overlapping at least one other of the partial images sampled by said sampling section is used as an object of the synthesizing process by said synthesis section.

15. The organism characteristic data acquiring apparatus as claimed in claim 1, wherein said sampling section obtains the sampled partial image while the organism portion is relatively moved with respect to a sampling face for sampling a partial image, and wherein characteristic portion data regarding one of the partial images, having an area which has a side shared by or overlapping at least one other of the partial images sampled by said sampling section is used as an object of the synthesizing process by said synthesis section.

16. The organism characteristic data acquiring apparatus as claimed in claim 2, wherein said sampling section obtains the sampled partial image while the organism portion is relatively moved with respect to a sampling face for sampling a partial image, and wherein characteristic portion data regarding one of the partial images, having an area which has a side shared by or overlapping at least one other of the partial images sampled by said sampling section is used as an object of the synthesizing process by said synthesis section.

17. An authentication apparatus for authenticating an object person of authentication based on the organism characteristic data, comprising:

a sampling section for successively sampling partial images of a portion of an organism of the object person of authentication, each sampled partial image having an overlapping portion shared with a previously sampled partial image sampled immediately before the sampled partial image;

a detection section for detecting, substantially contemporaneously and subsequent to obtaining the sampled partial image by said sampling section, a relative positional relationship between the sampled partial image and the previously sampled partial image based on the overlapping portion;

an extraction section for extracting, substantially contemporaneously and subsequent to detection of the relative positional relationship by said detection section, characteristic portion data including characteristic information unique to the organism portion from the sampled partial image;

a synthesis section for synthesizing, substantially contemporaneously and subsequent to extraction of the characteristic portion data by said extraction section, the characteristic portion data of the sampled partial image extracted by said extraction section and characteristic portion data of the previously sampled partial image based on the relative positional relationship of the sampled partial image detected by said detection section and outputting a result of the synthesis as organism characteristic data of the portion of the organism; and a collation section for executing a collation process using the organism characteristic data from said synthesis section in order to perform personal identification of the object person of authentication using sampled partial images forming less than an entire image of the portion of the organism sampled by said sampling section, and outputting a result of the collation process as an authentication result.

18. An authentication apparatus for authenticating an object person of authentication based on the organism characteristic data, comprising:

a sampling section for successively sampling partial images of a pattern formed from a ridge on a portion of an organism of the object person of authentication, each sampled partial image having an overlapping portion shared with a previously sampled partial image sampled immediately before the sampled partial image;

a detection section for detecting, substantially contemporaneously and subsequent to obtaining the sampled partial image by said sampling section, a relative positional relationship between the sampled partial image and the previously sampled partial image based on the overlapping portion;

a ridge structure data extraction section for extracting, substantially contemporaneously and subsequent to detection of the relative positional relationship by said detection section, ridge structure data including characteristic information unique to the organism portion from the sampled partial image;

a synthesis section for synthesizing, substantially contemporaneously and subsequent to extraction of the ridge structure data by said ridge structure data extraction section, the ridge structure data of the sampled partial image extracted by said ridge structure data extraction section and ridge structure data of the previously sampled partial image based on the relative positional relationship of the sampled partial image detected by said detection section and outputting a result of the synthesis;

a characteristic data extraction section for extracting characteristic data unique to the organism portion from the result of the synthesis outputted from said synthesis section; and a collation section for executing a collation process using the characteristic data extracted by said characteristic data extraction section in order to perform personal identification of the object person of authentication using sampled partial images forming less than an entire image of the portion of the organism sampled by said sampling section, and outputting a result of the collation process as an authentication result.

19. An organism characteristic data acquiring method performed by a processor, for acquiring organism characteristic data from an identification object person or a registration object person to authenticate the identification object person based on the organism characteristic data, the method comprising:

sampling successive partial images of a portion of an organism of each of the identification object person and/or the registration object person, each sampled partial image having an overlapping portion shared with a previously sampled partial image sampled immediately before the sampled partial image;

detecting, substantially contemporaneously and subsequent to obtaining the sampled partial image by said sampling, a relative positional relationship between the sampled partial image and the previously sampled partial image based on the overlapping portion;

extracting, substantially contemporaneously and subsequent to detection of the relative positional relationship by said detecting, characteristic portion data including characteristic information unique to the organism portion from the sampled partial image; and synthesizing, substantially contemporaneously and subsequent to extraction of the characteristic portion data by said extracting, the characteristic portion data of the sampled partial image extracted by said extracting and characteristic portion data of the previously sampled partial image based on the relative positional relationship of the sampled partial image detected by said detecting and outputting a result of the synthesis as organism characteristic data of the portion of the organism for authentication using sampled partial images forming less than an entire image of the portion of the organism sampled in said sampling.

20. The organism characteristic data acquiring method performed by a processor according to claim 19, wherein a pattern formed from a ridge on the portion of the organism is sampled by said sampling.

21. A computer-readable recording medium on which an organism characteristic data acquiring program for acquiring organism characteristic data, for at least one of registration organism characteristic data storage and an authentication unit for authenticating the identification object person, from an identification object person a or a registration object person to authenticate the identification object person based on the organism characteristic data is recorded, said program causing a computer to function as:

a detection section for detecting successive partial images, substantially contemporaneously and subsequent to obtaining a respective previously sampled partial image, sampled by a sampling section for sampling a partial image of a portion of an organism from each of the identification object person and/or the registration object person, each sampled partial image having an overlapping portion shared with the respective previously sampled partial image sampled immediately before the sampled partial image, a relative positional relationship between the sampled partial image and the previously sampled partial image based on the overlapping portion;

an extraction section for extracting, substantially contemporaneously and subsequent to detection of the relative positional relationship by said detection section, characteristic portion data including characteristic information unique to the organism portion from the sampled partial image; and a synthesis section for synthesizing, substantially contemporaneously and subsequent to extraction of the characteristic portion data by said extraction section, the characteristic portion data of the sampled partial image extracted by said extraction section and characteristic portion data of the previously sampled partial image based on the relative positional relationship of the sampled partial image detected by said detection section and outputting a result of the synthesis as organism characteristic data of the portion of the organism for the at least one of registration organism characteristic data storage and an authentication unit for authenticating the identification object person using sampled partial images forming less than an entire image of the portion of the organism sampled by said detection section.

22. The computer-readable recording medium according to claim 21, wherein when said program causes the computer to function as the sampling section, said program causes the computer to sample a pattern formed from a ridge on the portion of the organism.

* * * * *

UNITED STATES PATENT AND TRADEMARK OFFICE
CERTIFICATE OF CORRECTION

| | |
|---|---|
| PATENT NO. | : 7,599,529 B2 |
| APPLICATION NO. | : 10/705455 |
| DATED | : October 6, 2009 |
| INVENTOR(S) | : Fujii |

It is certified that error appears in the above-identified patent and that said Letters Patent is hereby corrected as shown below:

Column 31, Line 34, change "a or a" to --or a--.

Signed and Sealed this

Twenty-ninth Day of December, 2009

David J. Kappos
*Director of the United States Patent and Trademark Office*